(12) United States Patent
Rice

(10) Patent No.: US 10,723,325 B2
(45) Date of Patent: Jul. 28, 2020

(54) VEHICLE SENSOR CLEANING SYSTEM

(71) Applicant: UATC, LLC, San Francisco, CA (US)

(72) Inventor: Wesly Mason Rice, Glenshaw, PA (US)

(73) Assignee: UATC, LLC, San Francisco, CA (US)

( * ) Notice: Subject to any disclaimer, the term of this patent is extended or adjusted under 35 U.S.C. 154(b) by 224 days.

(21) Appl. No.: 15/839,137

(22) Filed: Dec. 12, 2017

(65) Prior Publication Data

US 2019/0135239 A1    May 9, 2019

Related U.S. Application Data

(60) Provisional application No. 62/583,153, filed on Nov. 8, 2017.

(51) Int. Cl.

| B60S 1/56 | (2006.01) |
|---|---|
| B60S 1/52 | (2006.01) |
| B08B 3/02 | (2006.01) |
| B60S 1/60 | (2006.01) |
| B05B 1/08 | (2006.01) |
| B60S 1/54 | (2006.01) |
| B60S 1/08 | (2006.01) |

(52) U.S. Cl.
CPC ............ B60S 1/56 (2013.01); B05B 1/08 (2013.01); B08B 3/02 (2013.01); B60S 1/0848 (2013.01); B60S 1/52 (2013.01); B60S 1/54 (2013.01); B60S 1/603 (2013.01)

(58) Field of Classification Search
None
See application file for complete search history.

(56) References Cited

U.S. PATENT DOCUMENTS

| 6,805,164 | B2 | 10/2004 | Stouffer |
| 8,702,020 | B2 | 4/2014 | Gopalan |
| 2011/0073142 | A1 | 3/2011 | Hattori et al. |

(Continued)

FOREIGN PATENT DOCUMENTS

| EP | 3069942 | 9/2016 |
| WO | WO2015/120866 | 8/2015 |
| WO | WO 2018/187089 | 10/2018 |

OTHER PUBLICATIONS

International Search Report and Written Opinion for Application No. PCT/US2018/059201, dated Jan. 31, 2019, 12 pages.

*Primary Examiner* — Mikhail Kornakov
*Assistant Examiner* — Ryan L. Coleman
(74) *Attorney, Agent, or Firm* — Dority & Manning, P.A.

(57) ABSTRACT

Systems and methods for cleaning sensors of a vehicle using a spray pattern are provided. A sensor cleaning system can include a fluid source that supplies a fluid and a nozzle configured to provide a spray of the fluid to a sensor of an autonomous vehicle to remove debris from the sensor. The sensor cleaning system can further include a controller comprising one or more processors and one or more non-transitory computer-readable media that collectively store instructions that, when executed by the one or more processors, cause the controller to perform operations. The operations can include obtaining sensor data from the sensor, determining a spray pattern based at least in part on the sensor data; and controlling a flow of the fluid from the fluid source to the nozzle based at least in part on the spray pattern.

18 Claims, 6 Drawing Sheets

(56) References Cited

U.S. PATENT DOCUMENTS

| | | | |
|---|---|---|---|
| 2013/0048036 A1 | 2/2013 | Jonas | |
| 2013/0092758 A1* | 4/2013 | Tanaka | B60S 1/52 |
| | | | 239/284.1 |
| 2015/0032292 A1 | 1/2015 | Stratton | |
| 2015/0202663 A1* | 7/2015 | Oba | H04N 5/2171 |
| | | | 348/375 |
| 2019/0106085 A1* | 4/2019 | Bacchus | B60S 1/04 |
| 2019/0270433 A1* | 9/2019 | Hester | B60S 1/50 |

* cited by examiner

VEHICLE SENSOR CLEANING SYSTEM

PRIORITY CLAIM

The present application is based on and claims benefit of U.S. Provisional Application 62/583,153 having a filing date of Nov. 8, 2017, which is incorporated by reference herein.

FIELD

The present disclosure relates generally to cleaning systems for vehicle sensors.

BACKGROUND

An autonomous vehicle is a vehicle that is capable of sensing its environment and navigating with minimal or no human input. In particular, an autonomous vehicle can observe its surrounding environment using a variety of sensors and can attempt to comprehend the environment by performing various processing techniques on sensor data collected by the sensors. Given knowledge of its surrounding environment, the autonomous vehicle can identify an appropriate motion path through such surrounding environment.

Thus, a key objective associated with an autonomous vehicle is the ability to perceive the location of objects that are proximate to the autonomous vehicle and/or determine other information about the autonomous vehicle and its relationship to the surrounding environment. One aspect such objective is the collection of sensor data by the variety of sensors included in or otherwise coupled to the vehicle.

However, autonomous vehicle sensors can suffer from the presence of precipitation, debris, contaminants, or environmental objects which interfere with the ability of the sensor to collect the sensor data. As one example, rain, snow, frost, or other weather-related conditions can degrade the quality of the sensor data collected by a given sensor when present. For example, raindrops, snow, or other condensation can collect on the lens or other components of a sensor (e.g., a camera or a Light Detection and Ranging (LIDAR) sensor), thereby degrading the quality of the sensor data collected by the sensor. As another example, dirt, dust, road salt, organic matter (e.g., "bug splatter," pollen, bird droppings, etc.), or other contaminants can accumulate on or adhere to a given sensor (e.g., on the sensor cover, housing, or other external component of the sensor), thereby degrading the quality of the sensor data collected by the sensor.

SUMMARY

Aspects and advantages of embodiments of the present disclosure will be set forth in part in the following description, or can be learned from the description, or can be learned through practice of the embodiments.

One example aspect of the present disclosure is directed to a sensor cleaning system configured to clean autonomous vehicle sensors. The sensor cleaning system can include a fluid source that supplies a fluid and a nozzle configured to provide a spray of the fluid to a sensor of an autonomous vehicle to remove debris from the sensor. The sensor cleaning system can further include a controller comprising one or more processors and one or more non-transitory computer-readable media that collectively store instructions that, when executed by the one or more processors, cause the controller to perform operations. The operations can include obtaining sensor data from the sensor, determining a spray pattern based at least in part on the sensor data, and controlling a flow of the fluid from the fluid source to the nozzle based at least in part on the spray pattern.

Another example aspect of the present disclosure is directed to a computer-implemented method to clean a sensor of an autonomous vehicle. The method can include obtaining, by a controller comprising one or more processors, sensor data. The method can further include determining, by the controller, a type of debris deposited on a sensor based at least in part on the sensor data. The method can further include determining, by the controller, a spray pattern based at least in part on the type of debris. The method can further include controlling, by the controller, a flow of the fluid from a fluid source to a nozzle based at least in part on the spray pattern.

Another example aspect of the present disclosure is directed an autonomous vehicle. The autonomous vehicle can include a sensor, and a sensor cleaning system configured to clean the sensor. The sensor cleaning system can include a fluid source that supplies a fluid. The fluid can be a fluid at a pressure of greater than 4.8 bar. The sensor cleaning system can further include a nozzle configured to provide a spray of the fluid to the sensor to remove debris from the sensor. The sensor cleaning system can further include a flow control device in fluid communication with the fluid source and the nozzle. The flow control device can be configured to allow or impede a flow of the fluid from the fluid source to the nozzle. The sensor cleaning system can further include a controller comprising one or more processors and one or more non-transitory computer-readable media that collectively store instructions that, when executed by the one or more processors, cause the controller to perform operations. The operations can include obtaining sensor data from the sensor, determining a spray pattern based at least in part on the sensor data, and controlling a flow of the fluid from the fluid source to the nozzle based at least in part on the spray pattern.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1:
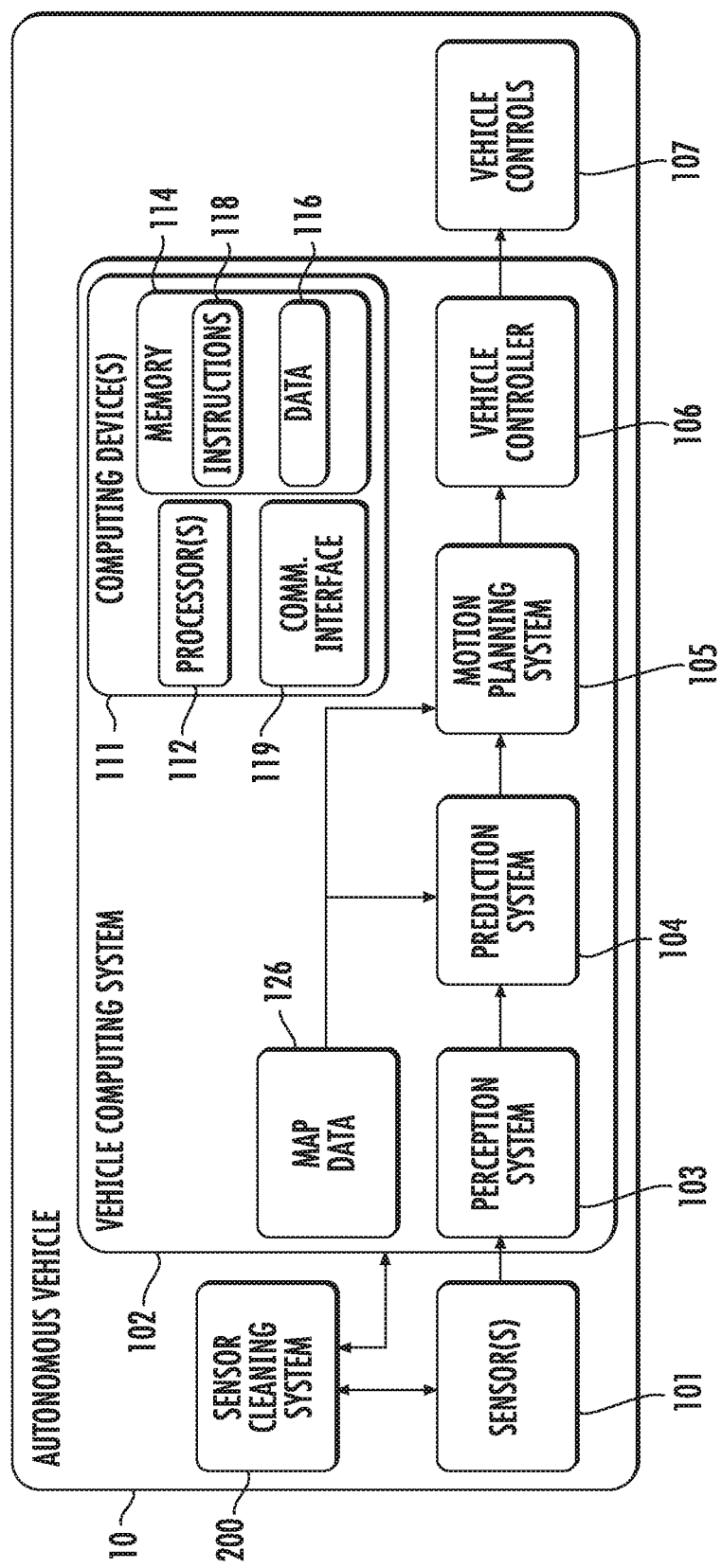
FIG. 1 depicts a block diagram of an example autonomous vehicle according to example embodiments of the present disclosure.

Example aspects of the present disclosure are directed to systems and methods for cleaning a sensor of an autonomous vehicle. For example, the systems and methods of the present disclosure can control a sensor cleaning system based at least in part on the type of debris deposited on the sensor. In particular, in some implementations of the present disclosure, a sensor cleaning system can include a fluid source that supplies a fluid and a nozzle configured to provide a spray of the fluid to a sensor of an autonomous vehicle to remove debris from the sensor. For example, in some implementations, the fluid source can be a pressurized tank configured to provide a cleaning liquid, and the nozzle can be a static or adjustable nozzle configured to provide a spray, such as an oscillating spray, of the cleaning liquid to a surface of the sensor in order to remove debris from the sensor. For example, the sensor can be a camera, a Light Detection and Ranging (LIDAR) system sensor, a Radio Detection and Ranging (RADAR) system sensor, and/or another type of sensor, and a nozzle can be positioned to provide a spray of fluid from the fluid source to a lens or other surface of the sensor. The sensor cleaning system can further include a controller. In some implementations, the controller can include one or more processors and one or more non-transitory computer readable media. The processor(s) can be configured to execute instructions that cause the controller to perform operations, such as operations to clean the sensor. In some implementations, the cleaning system can include a flow control device configured to allow or impede a flow of fluid to the nozzle. In some implementations, the controller can control the flow control device to allow fluid to flow from the fluid source to the nozzle.

For example, in some implementations, the controller can obtain sensor data from a sensor. The sensor data can be, for example, LIDAR data, radar data, imagery data, or other sensor data. The controller can then determine a spray pattern based at least in part on the sensor data. For example, in some implementations, the controller can determine a type of debris deposited on the sensor based at least in part on the sensor data. For example, the controller can perform one or more sensor data analysis techniques to determine whether and what type of debris may be deposited on the sensor. Further, in some implementations, the controller can determine a spray pattern based at least in part on the type of debris. For example, the spray pattern can be indicative of how long to spray a fluid (i.e., a spray duration), a spray location, a number of times to spray the fluid, and/or a pause duration between successive sprays. For example, the spray pattern can be a specific spray pattern previously determined to be effective in removing a particular type of debris. The controller can then control a flow of fluid from the fluid source to the nozzle based at least in part on the spray pattern. For example, in some implementations, the controller can control a flow control device (e.g., a valve or solenoid) to allow or impede the flow of fluid from the fluid source to the nozzle according to the spray pattern.

More particularly, an autonomous vehicle can be a ground-based autonomous vehicle (e.g., car, truck, bus, etc.), an air-based autonomous vehicle (e.g., airplane, drone, helicopter, or other aircraft), or other types of vehicles (e.g., watercraft). In some implementations, the autonomous vehicle can include a vehicle computing system that assists in controlling the autonomous vehicle. In particular, in some implementations, the vehicle computing system can receive sensor data from one or more sensors that are coupled to or otherwise included within the autonomous vehicle. As examples, the one or more sensors can include one or more LIDAR sensors, one or more RADAR sensors, one or more cameras (e.g., visible spectrum cameras, infrared cameras, etc.), and/or other sensors. The sensor data can include information that describes the location of objects within the surrounding environment of the autonomous vehicle.

In some implementations, the sensors can be located at various different locations on the autonomous vehicle. As an example, in some implementations, one or more cameras and/or LIDAR sensors can be located in a pod or other structure that is mounted on a roof of the autonomous vehicle while one or more RADAR sensors can be located in or behind the front and/or rear bumper(s) or body panel(s) of the autonomous vehicle. As another example, camera(s) can be located at the front or rear bumper(s) of the vehicle as well. Other locations can be used as well.

The autonomous vehicle can include a sensor cleaning system that cleans the one or more sensors of the autonomous vehicle. The sensor cleaning system can include one or more fluid source(s) that supply one or more fluid(s). As an example, in some implementations, the fluid source(s) can include a tank that stores a pressurized volume of a gas. For example, the tank can store pressurized air received from a compressor. As another example, the fluid source(s) can include a liquid reservoir that stores a liquid (e.g., a windshield washer liquid reservoir). In some implementations, the sensor cleaning system can include a pump that pumps the liquid from the liquid reservoir to the nozzle(s). As yet another example, in some implementations, the fluid source can include a tank that stores a pressurized volume of the liquid. For example, the volume of liquid can be pressurized using a pressurized gas (e.g., compressed air). In some implementations, the fluid can be a high pressure fluid, such as a fluid at a pressure of greater than 4.8 bar (approximately 70 psi).

The sensor cleaning system can include one or more nozzles that are configured to respectively clean the one or more sensors of the autonomous vehicle. In some implementations, each sensor can include one or more nozzles configured to provide a fluid to the sensor to delaminate debris from the sensor (e.g., from a surface of the sensor). In some implementations, a nozzle can be configured to provide a liquid fluid to the sensor. For example, the liquid fluid can be windshield washer fluid, methanol, propylene glycol, antifreeze, ethanol, and/or other liquids.

In some implementations, the nozzle can be configured to generate an oscillating fluid and spray the oscillating fluid onto the surface of a sensor. For example, in some implementations, the nozzle can include an oscillator with two bypass flow tubes and a mixing chamber. The nozzle can be configured such that fluid can flow through the two bypass flow tubes and mix at least in part with fluid in the mixing chamber to generate the oscillating fluid spray. In some implementations, the nozzle can be configured to delaminate debris from the sensor, such as by receiving a high pressure fluid (e.g., a liquid at a pressure greater than 4.8 bar), generating an oscillating fluid (e.g., oscillating liquid), and providing the oscillating fluid to a surface of the sensor to delaminate debris from the sensor.

In some implementations, the nozzle can be an adjustable nozzle that includes an adjustable mixing chamber. For example, in some implementations, the walls of the adjustable mixing chamber can be configured to extend or retract such that the mixing chamber expands or contracts. In some implementations, a controller can be configured to control the adjustable mixing chamber to adjust one or more properties of the oscillating fluid generated by the adjustable nozzle. For example, in some implementations, the controller can adjust an oscillation frequency, an oscillation angle, and/or a direction of a flow of the oscillating fluid by expanding or contracting various portions of the adjustable mixing chamber.

The cleaning system can further include a flow control device (e.g. a valve, a solenoid, etc.) configured to allow or impede the flow of fluid from the fluid source to a nozzle. In some implementations, the cleaning system can include a plurality of nozzles, and each nozzle can be configured to clean a sensor. In implementations in which a plurality of nozzles are included in the cleaning system, the cleaning system can include a plurality of flow control devices (e.g., solenoids), that respectively control a flow of the fluid from the fluid source(s) to each respective nozzle. In some implementations, a plurality of flow control devices can be included in a manifold (e.g., a solenoid manifold) or other combined structure. In some implementations, one or more of the flow control device manifolds (e.g., solenoid manifolds) can be integrated with the corresponding fluid source.

In some implementations, the cleaning system can include one or more controllers which can individually control each flow control device to allow the flow of the fluid to the corresponding nozzle to clean a corresponding sensor. In some implementations, the nozzle can generate an oscillating fluid to delaminate debris from the corresponding sensor. For example, one or more controllers can be configured to actuate a solenoid to allow the high pressure fluid to be provided to a nozzle, which can generate an oscillating fluid to delaminate debris from the sensor.

The controller can be configured to perform operations to clean the sensor. For example, in some implementations, the controller can obtain sensor data from a sensor. For example, a sensor, such as a camera or LIDAR sensor, can be configured to collect sensor data that describes the surrounding environment or other aspects of the autonomous vehicle. The sensor data can be, for example, imagery data obtained by a camera, LIDAR data obtained by a LIDAR sensor, RADAR data obtained by a RADAR sensor, or other sensor data obtained by a sensor. In some implementations, the controller can obtain the sensor data directly from the sensor, while in other implementations, the controller can obtain the sensor data from another computing system, such as via a network. In some implementations, the controller can obtain sensor data from a vehicle computing system, such as a vehicle computing system onboard an autonomous vehicle configured to assist in autonomous operation of the autonomous vehicle. In some implementations, the controller of the sensor cleaning system and any associated functionality can be incorporated into or otherwise included in such a vehicle computing system.

The controller can be configured to determine a spray pattern based at least in part on the sensor data. For example, in some implementations, the controller can determine a type of debris deposited on the sensor based at least in part on the sensor data. For example, the controller (either alone or in combination with other components or systems of the autonomous vehicle) can analyze the collected sensor data (e.g., camera data or LIDAR data) to determine whether any debris is deposited on the sensor and/or the type of debris.

As an example, the sensor data can indicate that a particular sensor is operating at a degraded level due to debris deposited on the sensor. For example, in some implementations, the controller can detect a disappearance of an observed object. For example, if the autonomous vehicle continuously observes a pedestrian over a period of sensor data collection and processing iterations, and then suddenly the pedestrian is no longer observed based on the sensor data, it can be assumed that one or more of the sensors that collected the corresponding sensor data may have debris on the sensor, thereby degrading the sensor's operation level. For example, a splash from a mud puddle may have obscured a portion of a sensor (e.g., a lens of a camera or a RADAR sensor), thereby causing the pedestrian to disappear from the sensor data collected by the sensor.

As another example, to determine that one or more sensors have debris deposited on the sensors, the computing system can detect an absence of an object that is expected to be observed. As an example, an autonomous vehicle can be located at a known location at which the autonomous vehicle would expect, for example based on map data, to observe a stoplight. However, if the autonomous vehicle does not observe the stoplight at the expected location, then it can be assumed that one or more of the sensors that would be expected to collect sensor data indicative of the expected object (e.g., a LIDAR sensor) has debris obscuring the sensor's data collection.

As another example, the sensor data can indicate that a particular sensor has debris deposited on the sensor. For example, a camera can collect imagery data and the controller can determine that debris has been deposited on the camera based at least in part on one or more characteristics of the imagery captured by the camera.

As examples, the controller can determine that dust debris (e.g., fine dirt, pollen, airborne particulates, etc.) has been deposited on a camera lens based at least in part on a sharpness and/or brightness of at least a portion of a frame included in imagery captured by the camera. For example, as dust deposits on the surface of a camera lens, the sharpness, brightness, and/or other characteristics of the imagery captured by the camera can degrade. If the sharpness, brightness, and/or other characteristic(s) fall below respective threshold value(s), then it can be determined that dust has been deposited on the camera, and therefore that the camera should be cleaned. As another example, if the sharpness, brightness, and/or other characteristic(s) degrades or otherwise worsens over a number of frames or over time, then it can similarly be determined that dust has deposited on the camera. As yet another example, if the sharpness, brightness, and/or other characteristic(s) of a first portion of a frame of imagery captured by the camera are significantly worse than the sharpness, brightness, and/or other characteristic(s) of a second portion of the same frame of imagery, then it can be determined that the dust has been deposited on the camera.

In yet another example, the controller can detect organic matter exhibited at a same location in a plurality of frames captured by a camera. For example, as the autonomous vehicle travels along a travel way, organic matter, such as bugs, mud, bird droppings, or other organic matter can accumulate on a camera lens, thereby occluding the camera's field of view over a number of frames of imagery. The controller can perform analysis on the imagery data in order to determine whether the debris deposited on the camera lens is organic matter. For example, different types of organic matter can have particular "splatter" patterns, shapes, colors, or other properties associated with the organic matter. In some implementations, the controller can be configured to determine that organic matter has been deposited on a sensor based on an analysis of such properties exhibited in the sensor data.

In some implementations, the controller can determine whether the organic matter is greater than or less than a threshold length. As an example, in some implementations, the controller can analyze imagery data to estimate a length of the organic matter. For example, the controller can use various imagery analysis techniques to determine an estimated length of an occlusion on a lens, such as, for example, a maximum length of the organic matter. In some implementations, the threshold length can be a length of approximately 0.25 inches. In other implementations, other threshold lengths can be used. In some implementations, the controller can be configured to determine a spray pattern to clean the sensor based at least in part on a length of the organic matter, as will be discussed below.

In some implementations, the controller can determine that light snow has been deposited on a sensor based at least in part on sensor data. For example, in some implementations, LIDAR and/or RADAR data can indicate that light snow is falling. For example, in some implementations, the controller can use LIDAR data to detect individual snowflakes. Similarly, imagery analysis of data from a camera can likewise indicate snow is falling. In some implementations, temperature data, such as data from a thermometer onboard the autonomous vehicle can indicate the autonomous vehicle is operating in freezing conditions, and thus light snow debris conditions are possible.

In some implementations, the controller can determine that salt spray or frozen road debris has been deposited on a sensor. For example, imagery analysis of imagery data collected from a camera can indicate that the autonomous vehicle is experiencing salt spray or frozen road conditions. The controller can further determine that other sensors (e.g., LIDAR or RADAR sensors) would be likely to encounter similar conditions. In some implementations, temperature data, such as data from thermometer onboard the autonomous vehicle can indicate the autonomous vehicle is operating in freezing conditions, and thus salt spray or frozen road debris conditions are possible.

In some implementations, the controller can determine that frost or ice debris has been deposited on the sensor based at least in part on sensor data. For example, in some implementations, the controller can use imagery data from a camera to determine that the autonomous vehicle is operating in frost or ice conditions. For example, imagery analysis can indicate ice crystals or other frost and/or ice formations are present on the camera. The controller can further determine that other sensors (e.g., LIDAR or RADAR sensors) would be likely to encounter similar conditions. In some implementations, temperature data, such as data from thermometer onboard the autonomous vehicle can indicate the autonomous vehicle is operating in freezing conditions, and thus frost or ice conditions are possible.

In some implementations, the controller can use data from a first sensor and data from a second sensor to determine the type of debris deposited on one or both of the sensors. For example, LIDAR data from a LIDAR sensor can indicate that light snow is falling, and a blocked field of view can be exhibited on imagery data from a camera. The controller can be configured to determine that the type of debris deposited on the camera is likely light snow using both the data from the first sensor and data from the second sensor. Similarly, data from a RADAR or LIDAR sensor can indicate that debris has accumulated on the sensor due to degraded data collected by the sensor, while imagery data from a camera can indicate that the vehicle recently encountered a specific type of debris (e.g., dust, organic matter, salt spray, ice, etc.). In such a situation, the controller can determine that the type of debris deposited on the RADAR or LIDAR sensor is likely the same as the debris deposited on the camera. Thus, using data from one or more sensors, the controller can be configured to determine whether debris is deposited on a sensor, as well as the type of debris.

The controller can determine the spray pattern based at least in part on the sensor data. For example, the spray pattern can be how long to spray (i.e., a spray duration), a spray location, a number of times to spray, and/or a pause duration between successive sprays. In some implementations, the controller can determine the spray pattern based at least in part on the type of debris deposited on a sensor.

For example, in some implementations, the spray pattern can be a single spray for a particular duration. For example, a short spray can be a spray of up to approximately 150 ms, an intermediate spray can be a spray between approximately 150 ms and approximately 350 ms, and a long spray can be a spray greater than approximately 350 ms up to approximately 10 seconds. As used herein, the term "approximately" when used in reference to a time duration or length means within plus or minus 20% of the stated value. Similarly, a short pause can be a pause of up to approximately 150 ms, an intermediate pause can be a pause between approximately 150 ms and approximately 350 ms, and a long pause can be a pause greater than approximately 350 ms up to approximately 10 seconds.

For example, in response to determining that dust debris is deposited on a sensor, in some implementations, the controller can configure the spray pattern as a single spray. In some implementations, the spray pattern can be an intermediate spray with a duration between approximately 150 ms and approximately 350 ms. In particular, in some implementations, the spray pattern can be a single intermediate spray of approximately 200 ms.

As another example, in response to determining that organic matter less than a threshold length has been deposited on a sensor, in some implementations, the controller can configure the spray pattern as a single spray. In some implementations, the threshold length can be a length of approximately 0.25 inches. In some implementations, the single spray can be a long spray with a duration greater than approximately 350 ms. In particular, in some implementations, the spray pattern can be a single long spray of approximately 400 ms.

As another example, in response to determining that light snow debris is deposited on a sensor, in some implementations, the controller can configure the spray pattern as a single spray. In some implementations, the spray pattern can be an intermediate spray with a duration between approximately 150 ms and approximately 350 ms. In particular, in some implementations, the spray pattern can be a single intermediate spray of approximately 200 ms.

As another example, in response to determining that salt spray or frozen road debris is deposited on a sensor, in some implementations, the controller can configure the spray pattern as a single spray. In some implementations, the spray pattern can be a long spray with a duration greater than approximately 350 ms. In particular, in some implementations, the spray pattern can be a single long spray of approximately 500 ms.

In some implementations, the spray pattern can be a first spray, a pause, and a second spray. For example, in response to determining that organic matter greater than a threshold length has been deposited on the sensor, in some implementations, the controller can configure the spray pattern as a first spray, a pause, and a second spray. In some implementations, the threshold length can be a length of approximately 0.25 inches. In some implementations, the first spray can be an intermediate spray with a duration between approximately 150 ms and approximately 350 ms. In particular, in some implementations, the first spray can be a short spray of approximately 200 ms. In some implementations, the pause can be an intermediate pause with a duration between approximately 150 ms and approximately 350 ms. In particular, in some implementations, the pause can be an intermediate pause of approximately 200 ms. In some implementations, the second spray can be an intermediate spray with a duration between approximately 150 ms and approximately 350 ms. In particular, in some implementations, the second spray can be a short spray of approximately 200 ms.

As another example, in response to determining that frost or ice is deposited on a sensor, in some implementations, the controller can configure the spray pattern as a first spray, a pause, and a second spray. In some implementations, the first spray can be a short spray with a duration less than approximately 150 ms. In particular, in some implementations, the first spray can be a short spray of approximately 100 ms. In some implementations, the pause can be a short pause with a duration of less than approximately 150 ms. In particular, in some implementations, the pause can be a short pause of approximately 100 ms. In some implementations, the second spray can be an intermediate spray with a duration between approximately 150 ms and approximately 350 ms. In particular, in some implementations, the second spray can be an intermediate spray of approximately 200 ms.

In other implementations, other spray patterns can be used based on various types of debris. For example, some spray patterns can include three or more sprays, with a plurality of pauses between successive sprays.

The controller can further be configured to control a flow of fluid from the fluid source to the nozzle based at least in part on the spray pattern. For example, the controller can be configured to control the flow of fluid from the fluid source to each respective nozzle to clean the corresponding sensor. In some implementations, the sensor cleaning system can include a plurality of flow control devices that respectively control a flow of the fluid (e.g., gas, liquid) to a plurality of nozzles. The controller can control each flow control device to allow the flow of the fluid to the corresponding nozzle to enable the nozzle to clean the corresponding sensor based on the respective spray pattern. For example, for a spray pattern of a single spray for a particular duration, the controller can control the flow control device to allow fluid to flow from the fluid source to the nozzle for the duration of the spray pattern. Similarly, for spray patterns which include a plurality of sprays, the controller can control a flow control device to spray for a first spray duration, pause for a pause duration, and spray for a second duration, etc.

In some implementations, the nozzle can be an adjustable nozzle, such as an adjustable nozzle configured to adjust one or more properties of the flow of the fluid from the nozzle. For example, the controller can be configured to adjust an adjustable mixing chamber of the nozzle to adjust an oscillation rate, an oscillation angle, or a direction of flow of oscillating fluid from the nozzle.

In some implementations, the adjustable nozzle can be controlled by the controller based at least in part on sensor data indicative of debris. For example, the sensor data from the sensor can indicate that debris is located on a particular part of the sensor or that the debris is a particular type of debris. In some implementations, the controller can control the adjustable nozzle based at least in part on the sensor data indicative of debris such as, for example, by controlling the oscillation rate, oscillation angle, or direction of flow of oscillating fluid from the nozzle based on the sensor data indicative of debris. For example, the controller can direct a flow of oscillating fluid to a particular area where the debris is located, and/or increase or decrease the oscillation rate of the oscillating fluid to improve the delaminating effect of the oscillating fluid.

In some implementations, the controller can further obtain sensor data indicative of a spray of fluid from the adjustable nozzle. For example, a camera can collect imagery data of the oscillating fluid from the adjustable nozzle spraying onto a lens of the camera. The imagery data can indicate, for example, whether or not the oscillating fluid is successfully delaminating the debris from the lens.

In some implementations, the controller can control the adjustable nozzle based at least in part on the sensor data indicative of the spray of fluid. For example, the controller can control the adjustable nozzle to adjust an oscillation rate, an oscillation angle, and/or a direction of flow of the oscillating fluid from the nozzle based on the data indicative of the spray of fluid. For example, the controller can use the sensor data indicative of the spray of fluid as a form of feedback in order to control the adjustable nozzle to direct the flow of oscillating fluid to more effectively delaminate the debris from the surface of the sensor. For example, the controller can use successive frames of imagery data to adjust the adjustable nozzle to direct the flow of fluid to a particular area of the sensor.

The systems and methods described herein may provide a number of technical effects and benefits. For example, a sensor cleaning system can be configured determine a spray pattern based at least in part on sensor data, and control the flow of fluid based on the spray pattern. In some implementations, the sensor cleaning system can determine a type of debris deposited on a sensor based at least in part on the sensor data, and determine a spray pattern based at least in part on the type of debris. This can allow for the removal of particular types of debris using spray patterns configured for the particular type of debris during operation of the autonomous vehicle, thereby enabling autonomous vehicle sensors to operate properly. Improved performance of autonomous vehicle sensors can lead to improved performance of the autonomous vehicle motion control, which relies upon data collected by the one or more sensors to comprehend the surrounding environment of the autonomous vehicle. Thus, the improved and intelligent sensor cleaning systems of the present disclosure can directly improve autonomous vehicle performance such as efficiency, safety, and passenger comfort.

Additionally, the systems and methods according to example aspects of the present disclosure can allow for a reduced amount of fluid to be used to clean the surface of the sensor by tailoring the spray pattern to the type of debris deposited. For example, by identifying the type of debris deposited on a sensor and determining a corresponding spray pattern based on the debris type, the amount of fluid used to delaminate debris from the sensor can be reduced as compared to spraying a fixed amount of fluid regardless of the type of debris. Further, the spray patterns described herein can be tailored based on the specific properties of a particular type of debris. For example, some types of debris may be easier to delaminate following pauses that allow the cleaning fluid to soak into the debris. The systems and methods described herein can allow for spray patterns to be used to account for the varying properties of specific debris types, which can further reduce the amount of fluid required to clean a sensor and allow for more efficient cleaning of the sensor.

Further, in implementations in which an adjustable nozzle is used, the oscillation frequency, oscillation angle, and/or the direction of flow of the oscillating fluid can be adjusted to delaminate debris from the sensor. In some implementations, sensor data indicative of the spray of fluid can be used as a feedback loop to control operation of the adjustable nozzle. By adjusting the oscillation angle, oscillation frequency, or direction of flow of the oscillating fluid, a targeted and/or increased flow of fluid can be provided to the region of a sensor in which the debris is located in order to delaminate the debris from the sensor. This can further allow for increased sensor cleaning capability, improved sensor operation, and a reduced amount of fluid needed to clean the sensor.

With reference now to the FIGS., example aspects of the present disclosure will be discussed in further detail. FIG. 1 depicts a block diagram of an example autonomous vehicle 10 according to example aspects of the present disclosure. The autonomous vehicle 10 can include one or more sensors 101, a vehicle computing system 102, and one or more vehicle controls 107. The vehicle computing system 102 can assist in controlling the autonomous vehicle 10. In particular, the vehicle computing system 102 can receive sensor data from the one or more sensors 101, attempt to comprehend the surrounding environment by performing various processing techniques on data collected by the sensors 101, and generate an appropriate motion path through such surrounding environment. The vehicle computing system 102 can control the one or more vehicle controls 107 to operate the autonomous vehicle 10 according to the motion path.

The vehicle computing system 102 can include one or more computing devices 111. The one or more computing devices 111 can include one or more processors 112 and one or more memory 114. The one or more processors 112 can be any suitable processing device (e.g., a processor core, a microprocessor, an ASIC, a FPGA, a computing device, a microcontroller, etc.) and can be one processor or a plurality of processors that are operatively connected. The one or more memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which can be executed by the processor 112 to cause vehicle computing system 102 to perform operations. The one or more computing devices 111 can also include a communication interface 119, which can allow the one or more computing devices 111 to communicate with other components of the autonomous vehicle 10 or external computing systems, such as via one or more wired or wireless networks.

As illustrated in FIG. 1, the vehicle computing system 102 can include a perception system 103, a prediction system 104, and a motion planning system 105 that cooperate to perceive the surrounding environment of the autonomous vehicle 10 and determine a motion plan for controlling the motion of the autonomous vehicle 10 accordingly. In some implementations, the perception system 103, the prediction system 104, the motion planning system 105 can be included in or otherwise part of a vehicle autonomy system. As used herein, the term "vehicle autonomy system" refers to a system configured to control the movement of an autonomous vehicle.

In particular, in some implementations, the perception system 103 can receive sensor data from the one or more sensors 101 that are coupled to or otherwise included within the autonomous vehicle 10. As examples, the one or more sensors 101 can include a Light Detection and Ranging (LIDAR) system, a Radio Detection and Ranging (RADAR) system, one or more cameras (e.g., visible spectrum cameras, infrared cameras, etc.), and/or other sensors. The sensor data can include information that describes the location of objects within the surrounding environment of the autonomous vehicle 10.

As one example, for a LIDAR system, the sensor data can include the location (e.g., in three-dimensional space relative to the LIDAR system) of a number of points that correspond to objects that have reflected a ranging laser. For example, a LIDAR system can measure distances by measuring the Time of Flight (TOF) that it takes a short laser pulse to travel from the sensor to an object and back, calculating the distance from the known speed of light.

As another example, for a RADAR system, the sensor data can include the location (e.g., in three-dimensional space relative to the RADAR system) of a number of points that correspond to objects that have reflected a ranging radio wave. For example, radio waves (e.g., pulsed or continuous) transmitted by the RADAR system can reflect off an object and return to a receiver of the RADAR system, giving information about the object's location and speed. Thus, a RADAR system can provide useful information about the current speed of an object.

As yet another example, for one or more cameras, various processing techniques (e.g., range imaging techniques such as, for example, structure from motion, structured light, stereo triangulation, and/or other techniques) can be performed to identify the location (e.g., in three-dimensional space relative to the one or more cameras) of a number of points that correspond to objects that are depicted in imagery captured by the one or more cameras. Other sensor systems can identify the location of points that correspond to objects as well.

As another example, the one or more sensors 101 can include a positioning system. The positioning system can determine a current position of the vehicle 10. The positioning system can be any device or circuitry for analyzing the position of the vehicle 10. For example, the positioning system can determine a position by using one or more of inertial sensors, a satellite positioning system, based on IP address, by using triangulation and/or proximity to network access points or other network components (e.g., cellular towers, WiFi access points, etc.) and/or other suitable techniques. The position of the vehicle 10 can be used by various systems of the vehicle computing system 102.

Thus, the one or more sensors 101 can be used to collect sensor data that includes information that describes the location (e.g., in three-dimensional space relative to the autonomous vehicle 10) of points that correspond to objects within the surrounding environment of the autonomous vehicle 10. In some implementations, the sensors 101 can be located at various different locations on the autonomous vehicle 10. As an example, in some implementations, one or more cameras and/or LIDAR sensors can be located in a pod or other structure that is mounted on a roof of the autonomous vehicle 10 while one or more RADAR sensors can be located in or behind the front and/or rear bumper(s) or body panel(s) of the autonomous vehicle 10. As another example, camera(s) can be located at the front or rear bumper(s) of the vehicle 10 as well. Other locations can be used as well.

In addition to the sensor data, the perception system 103 can retrieve or otherwise obtain map data 126 that provides detailed information about the surrounding environment of the autonomous vehicle 10. The map data 126 can provide information regarding: the identity and location of different travelways (e.g., roadways), road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travelway); traffic control data (e.g., the location and instructions of signage, traffic lights, or other traffic control devices); and/or any other map data that provides information that assists the vehicle computing system 102 in comprehending and perceiving its surrounding environment and its relationship thereto.

The perception system 103 can identify one or more objects that are proximate to the autonomous vehicle 10 based on sensor data received from the one or more sensors 101 and/or the map data 126. In particular, in some implementations, the perception system 103 can determine, for each object, state data that describes a current state of such object (also referred to as features of the object). As examples, the state data for each object can describe an estimate of the object's: current location (also referred to as position); current speed (also referred to as velocity); current acceleration; current heading; current orientation; size/shape/footprint (e.g., as represented by a bounding shape such as a bounding polygon or polyhedron); type/class (e.g., vehicle versus pedestrian versus bicycle versus other); yaw rate; distance from the autonomous vehicle; minimum path to interaction with the autonomous vehicle; minimum time duration to interaction with the autonomous vehicle; and/or other state information.

In some implementations, the perception system 103 can determine state data for each object over a number of iterations. In particular, the perception system 103 can update the state data for each object at each iteration. Thus, the perception system 103 can detect and track objects (e.g., vehicles) that are proximate to the autonomous vehicle 10 over time.

The prediction system 104 can receive the state data from the perception system 103 and predict one or more future locations for each object based on such state data. For example, the prediction system 104 can predict where each object will be located within the next 5 seconds, 10 seconds, 20 seconds, etc. As one example, an object can be predicted to adhere to its current trajectory according to its current speed. As another example, other, more sophisticated prediction techniques or modeling can be used.

The prediction system 104 can create prediction data associated with each of the respective one or more objects within the surrounding environment of the vehicle 10. The prediction data can be indicative of one or more predicted future locations of each respective object. For example, the prediction data can be indicative of a predicted trajectory (e.g., predicted path) of at least one object within the surrounding environment of the vehicle 10. For example, the predicted trajectory (e.g., path) can indicate a path along which the respective object is predicted to travel over time (and/or the speed at which the object is predicted to travel along the predicted path).

For example, in some implementations, the prediction system 104 can be a goal-oriented prediction system that generates one or more potential goals, selects one or more of the most likely potential goals, and develops one or more trajectories by which the object can achieve the one or more selected goals. For example, the prediction system 104 can include a scenario generation system that generates and/or scores the one or more goals for an object and a scenario development system that determines the one or more trajectories by which the object can achieve the goals. In some implementations, the prediction system 104 can include a machine-learned goal-scoring model, a machine-learned trajectory development model, and/or other machine-learned models.

In some implementations, the predictions system 104 can use state data indicative of an object type or classification to predict a trajectory for the object. As an example, the prediction system 104 can use state data provided by the perception system 103 to determine that particular object (e.g., an object classified as a vehicle) approaching an intersection and maneuvering into a left-turn lane intends to turn left. In such a situation, the prediction system 104 can predict a trajectory (e.g., path) corresponding to a left-turn for the vehicle such that the vehicle turns left at the intersection. Similarly, the prediction system 104 can determine predicted trajectories for other objects, such as bicycles, pedestrians, parked vehicles, etc. The prediction system 104 can provide the predicted trajectories associated with the object(s) to the motion planning system 105.

The motion planning system 105 can determine a motion plan for the autonomous vehicle 10 based at least in part on the predicted trajectories associated with the objects within the surrounding environment of the vehicle and/or the state data for the objects provided by the perception system 103. Stated differently, given information about the current locations of objects and/or predicted trajectories of objects within the surrounding environment of the autonomous vehicle 10, the motion planning system 105 can determine a motion plan for the autonomous vehicle 10 that best navigates the autonomous vehicle 10 relative to the objects at such locations and their predicted trajectories.

In some implementations, the motion planning system 105 can evaluate one or more cost functions and/or one or more reward functions for each of one or more candidate motion plans for the autonomous vehicle 10. For example, the cost function(s) can describe a cost (e.g., over time) of adhering to a particular candidate motion plan while the reward function(s) can describe a reward for adhering to the particular candidate motion plan. For example, the reward can be of opposite sign to the cost.

Thus, given information about the current locations and/or predicted future locations/trajectories of objects, the motion planning system 105 can determine a total cost (e.g., a sum of the cost(s) and/or reward(s) provided by the cost function(s) and/or reward function(s)) of adhering to a particular candidate pathway. The motion planning system 105 can select or determine a motion plan for the autonomous vehicle 10 based at least in part on the cost function(s) and the reward function(s). For example, the motion plan that minimizes the total cost can be selected or otherwise determined. The motion plan can be, for example, a path along which the autonomous vehicle 10 will travel in one or more forthcoming time periods. The motion planning system 105 can provide the selected motion plan to a vehicle controller 106 that controls one or more vehicle controls 107 (e.g., actuators or other devices that control gas flow, steering, braking, etc.) to execute the selected motion plan. In some implementations, the motion planning system 105 can be configured to iteratively update the motion plan for the autonomous vehicle 10 as new sensor data is obtained from one or more sensors 101. For example, as new sensor data is obtained from one or more sensors 101, the sensor data can be analyzed by the perception system 103, the prediction system 104, and the motion planning system 105 to determine the motion plan.

Each of the perception system 103, the prediction system 104, and the motion planning system 105 can be included in or otherwise a part of a vehicle autonomy system configured to determine a motion plan based at least in part on data obtained from one or more sensors 101. For example, data obtained by one or more sensors 101 can be analyzed by each of the perception system 103, the prediction system 104, and the motion planning system 105 in a consecutive fashion in order to develop the motion plan. While FIG. 1 depicts elements suitable for use in a vehicle autonomy system according to example aspects of the present disclosure, one of ordinary skill in the art will recognize that other vehicle autonomy systems can be configured to determine a motion plan for an autonomous vehicle based on sensor data.

Each of the perception system 103, the prediction system 104, the motion planning system 105, and the vehicle controller 106 can include computer logic utilized to provide desired functionality. In some implementations, each of the perception system 103, the prediction system 104, the motion planning system 105, and the vehicle controller 106 can be implemented in hardware, firmware, and/or software controlling a general purpose processor. For example, in some implementations, each of the perception system 103, the prediction system 104, the motion planning system 105, and the vehicle controller 106 includes program files stored on a storage device, loaded into a memory and executed by one or more processors. In other implementations, each of the perception system 103, the prediction system 104, the motion planning system 105, and the vehicle controller 106 includes one or more sets of computer-executable instructions that are stored in a tangible computer-readable storage medium such as RAM hard disk or optical or magnetic media.

The autonomous vehicle 10 can further include a sensor cleaning system 200 configured to clean one or more sensors 101 of the autonomous vehicle 10.

Figure 2:
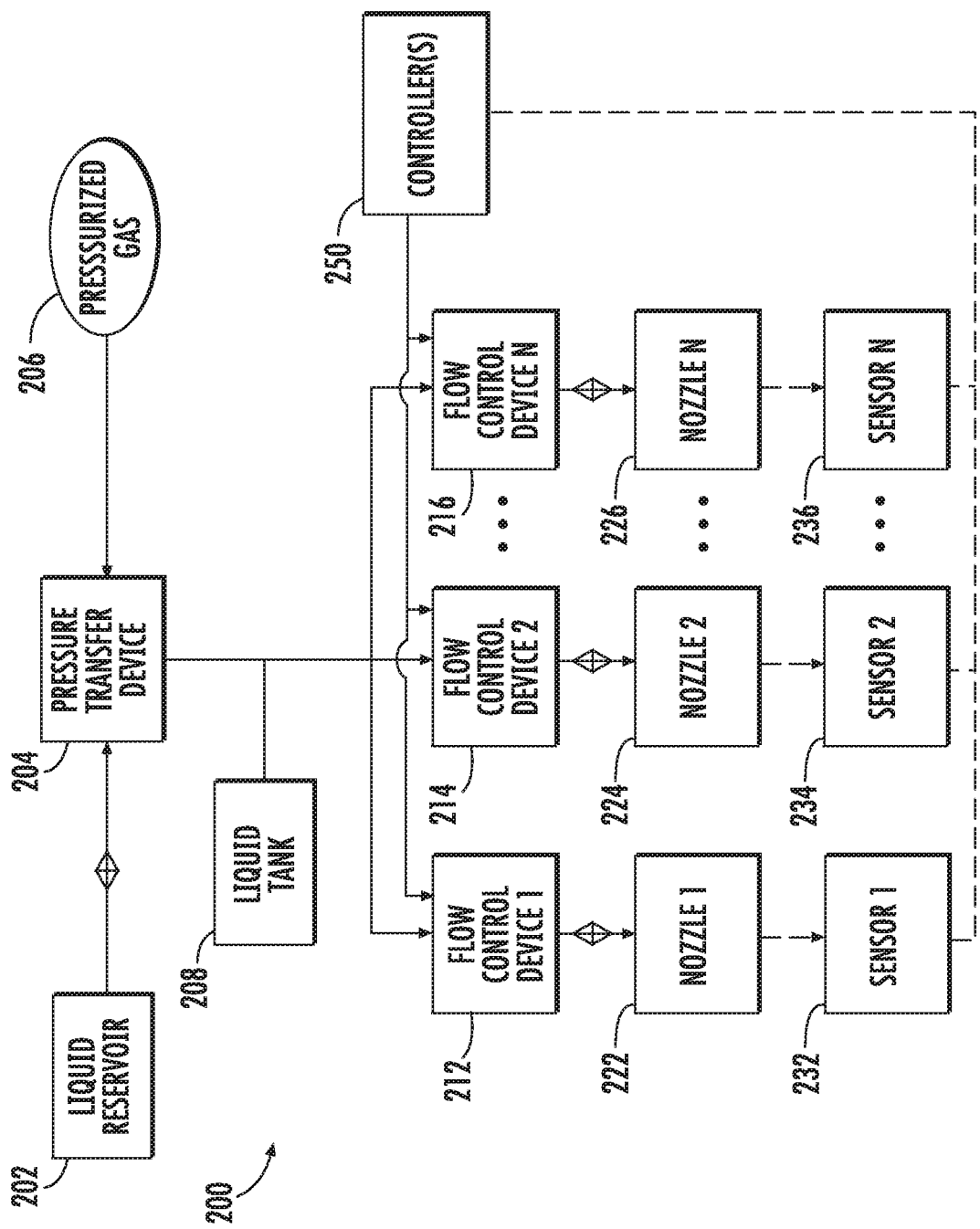
FIG. 2 depicts a block diagram of an example cleaning system according to example aspects of the present disclosure.

FIG. 2 depicts a block diagram of an example fluid-based (e.g., liquid, air) sensor cleaning system 200 according to example embodiments of the present disclosure. The fluid-based sensor cleaning system 200 can be included in an autonomous vehicle 10 to clean the sensors 101 of the autonomous vehicle 10.

In particular, as shown, the system 200 is a pressurized-gas, liquid cleaning system 200. In various other implementations, the system 200 can be a hydraulic pressurized fluid cleaning system, such as liquid pressurized via one or more pumps. Further, in some implementations, the system 200 can be a pressurized gas cleaning system, wherein the cleaning fluid can be pressurized gas (e.g., compressed air), such as from a source of pressurized gas 206.

The fluid-based sensor cleaning system 200 of FIG. 2 includes a pressure transfer device 204. The pressure transfer device 204 can receive liquid from a liquid reservoir 202. For example, the liquid reservoir 202 can be a windshield washer reservoir of the autonomous vehicle. In some implementations, the liquid fluid can be windshield washer fluid, methanol, propylene glycol, antifreeze, and/or ethanol.

In some implementations, the pressure transfer device 204 can pull liquid from the liquid reservoir 202. For example, the pressure transfer device 204 can include an internal mechanism that operates to draw liquid from the liquid reservoir 202 to the pressure transfer device 204. In one example, such internal mechanism includes a biasing element (e.g., a mechanical spring) that biases a partition included in the pressure transfer device 204 toward increasing a volume of a liquid chamber in the device 204, thereby pulling liquid from the reservoir 202 to the device 204. In other implementations, the system 200 can include a pump (not illustrated) that actively pumps or pushes the liquid from the liquid reservoir 202 to the pressure transfer device 204. The pump can be controlled (e.g., by the one or more controllers 250) based on knowledge of an amount of liquid included in the pressure transfer device 204 and/or the liquid tank 208. For example, various sensors or other components can be used to monitor the amount of liquid included in the pressure transfer device 204 and/or the liquid tank 208. When additional liquid is desired, the pump is operated to pump liquid from the reservoir 202 to the pressure transfer device 204.

Referring still to FIG. 2, the pressure transfer device 204 can use pressurized gas 206 to pressurize the liquid received from the liquid reservoir 202. Liquid pressurized by the pressure transfer device can be stored in a liquid tank 208. For example, the liquid tank 208 can be a liquid accumulator. In some implementations, the liquid tank 208 and the pressure transfer device 204 can be integrated together into a single component. The liquid reservoir 202, pressure transfer device 204, pressurized gas 206, the liquid tank 208, a liquid pump (not shown), or any other suitable fluid source can be included in or otherwise form a part of a fluid source, source of pressurized fluid, or source of high pressure fluid, as those terms are used herein. The components 202-208 shown in FIG. 2 are illustrative of one example fluid source, but one of ordinary skill in the art will recognize that any number of fluid sources can be used to provide a pressurized fluid in a cleaning system, as described herein.

In some implementations, the liquid reservoir 202, pressure transfer device 204, pressurized gas 206, the liquid tank 208, and/or any other fluid source can be a high pressure fluid source. For example, in some implementations, the fluid stored in the liquid tank 208 and/or the pressurized gas 206 can be at a pressure greater than 4.8 bar (approximately 70 psi). Referring still to FIG. 2, the pressurized fluid provided by the pressure transfer device 204 and/or stored in the tank 208 can be respectively provided to a plurality of flow control devices 212, 214, and 216.

The fluid-based sensor cleaning system 200 can also include a plurality of nozzles, as shown at 222, 224, and 226. Although three nozzles 222-226 are shown, any number of nozzles can be included in the system 200. Each nozzle 222-226 can use the pressurized fluid (e.g., pressurized liquid, compressed air) to clean a respective sensor, as shown at 232, 234, and 236. The sensors 232-236 can correspond to, for example, individual sensors 101 depicted in FIG. 1. For example, each nozzle 222-226 can spray or otherwise release the pressurized fluid onto the sensor (e.g., a lens, cover, housing, or other portion of the sensor) to remove contaminants or other debris from the sensor (e.g., from the lens, cover, housing, or other portion of the sensor). In some implementations, one or more of the nozzles 222-226 can include a nozzle that sprays the pressurized fluid onto the sensor 232-236 to clean the sensor 232-236. In some implementations, each nozzle 222-226 can be integral to the corresponding sensor 232-236.

The fluid-based sensor cleaning system 200 can also include the plurality of flow control devices, as shown at 212, 214, and 216. The flow control devices 212-216 can respectively control a flow of the pressurized fluid from the pressure transfer device 204 and/or the liquid tank 208 to the plurality of nozzles 222-226.

The sensor cleaning system 200 can further include one or more controllers 250 (also referred to as a computing device). The one or more controllers 250 can individually control each flow control device 212-216 to allow the flow of the pressurized fluid to the corresponding nozzle 222-226 to enable the corresponding nozzle 222-226 to individually clean the corresponding sensor 232-236, such as according to a spray pattern.

The one or more controllers 250 can include one or more control devices, nozzles, or components that interface with or otherwise control the one or more flow control devices 212-216. As examples, a controller 250 can include one or more chips (e.g., ASIC or FPGA), expansion cards, and/or electronic circuitry (e.g., amplifiers, transistors, capacitors, etc.) that are organized or otherwise configured to control one or more flow control devices (e.g., by way of control signals). In some implementations, a controller 250 can include a processor that loads and executes instructions stored in a computer-readable media to perform operations.

In some implementations, the one or more controllers 250 include a single controller. In some implementations, the one or more controllers 250 include a plurality of controllers that respectively control the plurality of flow control devices 212-216. In some implementations, the one or more controllers 250 can be physically located on a control board. For example, the control board can be physically coupled to a flow control device manifold, as described below.

In some implementations, the plurality of flow control devices 212-216 can include a plurality of solenoids that are individually controllable by the one or more controllers 250 to respectively allow or impede the flow of the pressurized fluid to the corresponding nozzle 222-226. That is, the one or more controllers 250 can individually control each solenoid to control the respective flow of liquid to the corresponding nozzle 222-226, thereby enabling cleaning of each sensor 232-236 according to a respective spray pattern for the sensor 232-236.

For example, the controller 250 can be configured to perform operations to clean the sensor 232-236. For example, in some implementations, the controller 250 can obtain sensor data from a sensor 232-236. For example, a sensor 232-236, such as a camera or LIDAR sensor, can be configured to collect sensor data that describes the surrounding environment or other aspects of the autonomous vehicle 10. The sensor data can be, for example, imagery data obtained by a camera, LIDAR data obtained by a LIDAR sensor, RADAR data obtained by a RADAR sensor, or other sensor data obtained by a sensor 232-236. In some implementations, the controller 250 can obtain the sensor data directly from the sensor 232-236, while in other implementations, the controller 250 can obtain the sensor data from another computing system, such as via a network. In some implementations, the controller 250 can obtain sensor data from a vehicle computing system 102, such as a vehicle computing system 102 onboard an autonomous vehicle 10 configured to assist in autonomous operation of the autonomous vehicle 10. In some implementations, the controller 250 of the sensor cleaning system 200 and any associated functionality can be incorporated into or otherwise included in such a vehicle computing system 102.

The controller 250 can be configured to determine a spray pattern based at least in part on the sensor data. For example, in some implementations, the controller 250 can determine a type of debris deposited on the sensor 232-236 based at least in part on the sensor data. For example, the controller 250 (either alone or in combination with other components or systems of the autonomous vehicle 10) can analyze the collected sensor data (e.g., camera data or LIDAR data) to determine whether any debris is deposited on the sensor 232-236 and/or the type of debris.

As an example, the sensor data can indicate that a particular sensor 232-236 is operating at a degraded level due to debris deposited on the sensor 232-236. For example, in some implementations, the controller 250 can detect a disappearance of an observed object. For example, if the autonomous vehicle 10 continuously observes a pedestrian over a period of sensor data collection and processing iterations, and then suddenly the pedestrian is no longer observed based on the sensor data, it can be assumed that one or more of the sensors 232-236 that collected the corresponding sensor data may have debris on the sensor 232-236, thereby degrading the sensor's 232-236 operation level. For example, a splash from a mud puddle may have obscured a portion of a sensor 232-236 (e.g., a lens of a camera or a RADAR sensor, thereby causing the pedestrian to disappear from the sensor data collected by the sensor 232-236.

As another example, to determine that one or more sensors 232-236 have debris deposited on the sensors 232-236, the controller 250 can detect an absence of an object that is expected to be observed. As an example, an autonomous vehicle 10 can be located at a known location at which the autonomous vehicle 10 would expect, for example based on map data 126, to observe a stoplight. However, if the autonomous vehicle 10 does not observe the stoplight at the expected location, then it can be assumed that one or more of the sensors 232-236 that would be expected to collect sensor data indicative of the expected object (e.g., a LIDAR sensor) has debris obscuring the sensor's 232-236 data collection.

As another example, the sensor data can indicate that a particular sensor 232-236 has debris deposited on the sensor 232-236. For example, a camera can collect imagery data and the controller 250 can determine that debris has been deposited on the camera based at least in part on one or more characteristics of the imagery captured by the camera.

As examples, the controller 250 can determine that dust debris (e.g., fine dirt, pollen, airborne particulates, etc.) has been deposited on a camera lens based at least in part on a sharpness and/or brightness of at least a portion of a frame included in imagery captured by the camera. For example, as dust deposits on the surface of a camera lens, the sharpness, brightness, and/or other characteristics of the imagery captured by the camera can degrade. If the sharpness, brightness, and/or other characteristic(s) fall below respective threshold value(s), then it can be determined that dust has been deposited on the camera, and therefore that the camera should be cleaned. As another example, if the sharpness, brightness, and/or other characteristic(s) degrades or otherwise worsens over a number of frames or over time, then it can similarly be determined that dust has deposited on the camera. As yet another example, if the sharpness, brightness, and/or other characteristic(s) of a first portion of a frame of imagery captured by the camera are significantly worse than the sharpness, brightness, and/or other characteristic(s) of a second portion of the same frame of imagery, then it can be determined that the dust has been deposited on the camera.

In yet another example, the controller 250 can detect organic matter exhibited at a same location in a plurality of frames captured by a camera. For example, as the autonomous vehicle 10 travels along a travel way, organic matter, such as bugs, mud, bird droppings, or other organic matter can accumulate on a camera lens, thereby occluding the camera's field of view over a number of frames of imagery.

The controller 250 can perform analysis on the imagery data in order to determine whether the debris deposited on the camera lens is organic matter. For example, different types of organic matter can have particular "splatter" patterns, shapes, colors, or other properties associated with the organic matter. In some implementations, the controller 250 can be configured to determine that organic matter has been deposited on a sensor 232-236 based on an analysis of such properties exhibited in the sensor data.

In some implementations, the controller 250 can determine whether the organic matter is greater than or less than a threshold length. As an example, in some implementations, the controller 250 can analyze imagery data to estimate a length of the organic matter. For example, the controller 250 can use various imagery analysis techniques to determine an estimated length of an occlusion on a lens, such as, for example, a maximum length of the organic matter. In some implementations, the threshold length can be a length of approximately 0.25 inches. In other implementations, other threshold lengths can be used. In some implementations, the controller 250 can be configured to determine a spray pattern to clean the sensor 232-236 based at least in part on a length of the organic matter, as will be discussed below.

In some implementations, the controller 250 can determine that light snow has been deposited on a sensor 232-236 based at least in part on sensor data. For example, in some implementations, LIDAR and/or RADAR data can indicate that light snow is falling. For example, in some implementations, the controller 250 can use LIDAR data to detect individual snowflakes. Similarly, imagery analysis of data from a camera can likewise indicate snow is falling. In some implementations, temperature data, such as data from a thermometer onboard the autonomous vehicle 10 can indicate the autonomous vehicle 10 is operating in freezing conditions, and thus light snow debris conditions are possible.

In some implementations, the controller 250 can determine that salt spray or frozen road debris has been deposited on a sensor 232-236. For example, imagery analysis of imagery data collected from a camera can indicate that the autonomous vehicle 10 is experiencing salt spray or frozen road conditions. The controller 250 can further determine that other sensors 232-236 (e.g., LIDAR or RADAR sensors) would be likely to encounter similar conditions. In some implementations, temperature data, such as data from a thermometer onboard the autonomous vehicle 10 can indicate the autonomous vehicle 10 is operating in freezing conditions, and thus salt spray or frozen road debris conditions are possible.

In some implementations, the controller 250 can determine that frost or ice debris has been deposited on the sensor 232-236 based at least in part on sensor data. For example, in some implementations, the controller 250 can use imagery data from a camera to determine that the autonomous vehicle 10 is operating in frost or ice conditions. For example, imagery analysis can indicate ice crystals or other frost and/or ice formations are present on the camera. The controller 250 can further determine that other sensors 232-236 (e.g., LIDAR or RADAR sensors) would be likely to encounter similar conditions. In some implementations, temperature data, such as data from thermometer onboard the autonomous vehicle 10 can indicate the autonomous vehicle 10 is operating in freezing conditions, and thus frost or ice conditions are possible.

In some implementations, the controller 250 can use data from a first sensor 232-236 and data from a second sensor 232-236 to determine the type of debris deposited on one or both of the sensors 232-236. For example, LIDAR data from a LIDAR sensor 232-236 can indicate that light snow is falling, and a blocked field of view can be exhibited on imagery data from a camera. The controller 250 can be configured to determine that the type of debris deposited on the camera is likely light snow using both the data from the first sensor 232-236 and data from the second sensor 232-236. Similarly, data from a RADAR or LIDAR sensor can indicate that debris has accumulated on the sensor 232-236 due to degraded data collected by the sensor 232-236, while imagery data from a camera can indicate that the vehicle recently encountered a specific type of debris (e.g., dust, organic matter, salt spray, ice, etc.). In such a situation, the controller 250 can determine that the type of debris deposited on the RADAR or LIDAR sensor is likely the same as the debris deposited on the camera. Thus, using data from one or more sensors 232-236, the controller 250 can be configured to determine whether debris is deposited on a sensor 232-236, as well as the type of debris.

In some implementations, the controller 250 can determine the spray pattern based at least in part on the sensor data. For example, the spray pattern can be how long to spray (i.e., a spray duration), a spray location, a number of times to spray, and/or a pause duration between successive sprays. In some implementations, the controller 250 can determine the spray pattern based at least in part on the type of debris deposited on a sensor 232-236.

For example, in some implementations, the spray pattern can be a single spray for a particular duration. For example, a short spray can be a spray of up to 150 ms, an intermediate spray can be a spray between approximately 150 ms and approximately 350 ms, and a long spray can be a spray greater than approximately 350 ms. Similarly, a short pause can be a pause of up to 150 ms, an intermediate pause can be a pause between approximately 150 ms and approximately 350 ms, and a long pause can be a pause greater than approximately 350 ms.

For example, in response to determining that dust debris is deposited on a sensor 232-236, in some implementations, the controller 250 can configure the spray pattern as a single spray. In some implementations, the spray pattern can be an intermediate spray with a duration between approximately 150 ms and approximately 350 ms. In particular, in some implementations, the spray pattern can be a single intermediate spray of approximately 200 ms.

As another example, in response to determining that organic matter less than a threshold length has been deposited on a sensor 232-236, in some implementations, the controller 250 can configure the spray pattern as a single spray. In some implementations, the threshold length can be a length of approximately 0.25 inches. In some implementations, the single spray can be a long spray with a duration greater than approximately 350 ms. In particular, in some implementations, the spray pattern can be a single long spray of approximately 400 ms.

As another example, in response to determining that light snow debris is deposited on a sensor 232-236, in some implementations, the controller 250 can configure the spray pattern as a single spray. In some implementations, the spray pattern can be an intermediate spray with a duration between approximately 150 ms and approximately 350 ms. In particular, in some implementations, the spray pattern can be a single intermediate spray of approximately 200 ms.

As another example, in response to determining that salt spray or frozen road debris is deposited on a sensor 232-236, in some implementations, the controller 250 can configure the spray pattern as a single spray. In some implementations, the spray pattern can be a long spray with a duration greater than approximately 350 ms. In particular, in some implementations, the spray pattern can be a single long spray of approximately 500 ms.

In some implementations, the spray pattern can be a first spray, a pause, and a second spray. For example, in response to determining that organic matter greater than a threshold length has been deposited on the sensor 232-236, in some implementations, the controller 250 can configure the spray pattern as a first spray, a pause, and a second spray. In some implementations, the threshold length can be a length of approximately 0.25 inches. In some implementations, the first spray can be an intermediate spray with a duration between approximately 150 ms and approximately 350 ms. In particular, in some implementations, the first spray can be a short spray of approximately 200 ms. In some implementations, the pause can be an intermediate pause with a duration between approximately 150 ms and approximately 350 ms. In particular, in some implementations, the pause can be an intermediate pause of approximately 200 ms. In some implementations, the second spray can be an intermediate spray with a duration between approximately 150 ms and approximately 350 ms. In particular, in some implementations, the second spray can be a short spray of approximately 200 ms.

As another example, in response to determining that frost or ice is deposited on a sensor 232-236, in some implementations, the controller 250 can configure the spray pattern as a first spray, a pause, and a second spray. In some implementations, the first spray can be a short spray with a duration less than approximately 150 ms. In particular, in some implementations, the first spray can be a short spray of approximately 100 ms. In some implementations, the pause can be a short pause with a duration of less than approximately 150 ms. In particular, in some implementations, the pause can be a short pause of approximately 100 ms. In some implementations, the second spray can be an intermediate spray with a duration between approximately 150 ms and approximately 350 ms. In particular, in some implementations, the second spray can be an intermediate spray of approximately 200 ms.

In other implementations, other spray patterns can be used based on various types of debris. For example, some spray patterns can include three or more sprays, with a plurality of pauses between successive sprays.

The controller 250 can further be configured to control a flow of fluid from the fluid source (e.g., liquid tank 208) to a nozzle 222-226 based at least in part on the spray pattern. For example, the controller 250 can be configured to control the flow of fluid from the fluid source (e.g., liquid tank 208) to each respective nozzle 222-226 to clean the corresponding sensor 232-236. In some implementations, the controller 250 can control each flow control device 212-216 to allow the flow of the fluid to the corresponding nozzle 222-226 to enable the nozzle 222-226 to clean the corresponding sensor 232-236 based on the respective spray pattern. For example, for a spray pattern of a single spray for a particular duration, the controller 250 can control the flow control device 212-216 to allow fluid to flow from the fluid source (liquid tank 208, pressurized gas 206, etc.) to the nozzle 222-226 for the duration of the spray pattern. Similarly, for spray patterns which include a plurality of sprays, the controller 250 can control a flow control device 212-216 to spray for a first spray duration, pause for a pause duration, and spray for a second duration, etc.

In some implementations, one or more of the flow control device manifolds (e.g., solenoid manifolds) can be integrated with the liquid tank 208. As an example, a solenoid manifold that controls the respective flow of the pressurized fluid to the nozzles 222-226 can be physically located within a pressurized volume of the fluid stored by a liquid tank 208. In some implementations, the one or more controllers 250 can also be integrated with the liquid tank 208.

Inclusion of the flow control device manifold within the liquid tank 208 enables such components to be provided as a single package, thereby saving space. Inclusion of the flow control device manifold within the liquid tank 208 also decreases the respective fluid flow distances from the tank 208 to the nozzles 222-226, thereby eliminating pressure loss due to hose length and, conversely, increasing pressure of the fluid when used by the nozzles 222-226.

In addition, in some implementations, the integrated liquid tank can further include valves, a pressure sensor, and/or controls coupled thereto or otherwise integrated therewith.

In some implementations, an entirety of the sensor cleaning system 200 exclusive of wiring is physically located external to a cab of the autonomous vehicle. As one example, all system components except for the liquid reservoir 202 can be located on the roof of the vehicle (e.g., in the pod mounted on the roof of the vehicle). For example, the liquid reservoir 202 can be located under a hood of the vehicle. In addition, in some implementations, the entirety of the sensor cleaning system 200 inclusive of wiring is physically located external to the cab of the autonomous vehicle.

In some implementations, the sensor cleaning system 200 can further include a controller area network. For example, the one or more controllers 250 can transmit control signals on the controller area network to control the plurality of flow control devices 212-216. Use of a controller area network by the sensor cleaning system 200 contrasts with the more typical use of a local interconnect network in vehicular applications. Use of a controller area network enables use a message broadcast and renders the sensor cleaning system 200 infinitely scalable from a communications perspective.

As one example, in some implementations, at least two or more of the flow control devices 212-216 can be integrated into the liquid tank 208, as described above. The integrated tank can include a number of connection pins that receive control signals from the controller area network. In some implementations, the control signals that control the flow control devices 212-216 can include a sequence signal and a firing order signal that instruct the integrated tank how to control the corresponding flow control devices 212-216. In one example, the integrated tank can have four connection pins that respectively correspond to power, ground, sequence, and firing order.

An advantage provided by the example cleaning systems 200 of the present disclosure is the ability to use a high pressure fluid to clean one or more sensors 232-236 of an autonomous vehicle 10. Using a high pressure fluid can allow for increased delamination of debris from a sensor 232-236. Further, the example cleaning systems 200 of the present disclosure can allow for a sensor 232-236 to be cleaned according to a spray pattern, such as a spray pattern determined based on a type of debris deposited on the sensor 232-236.

Figure 3:
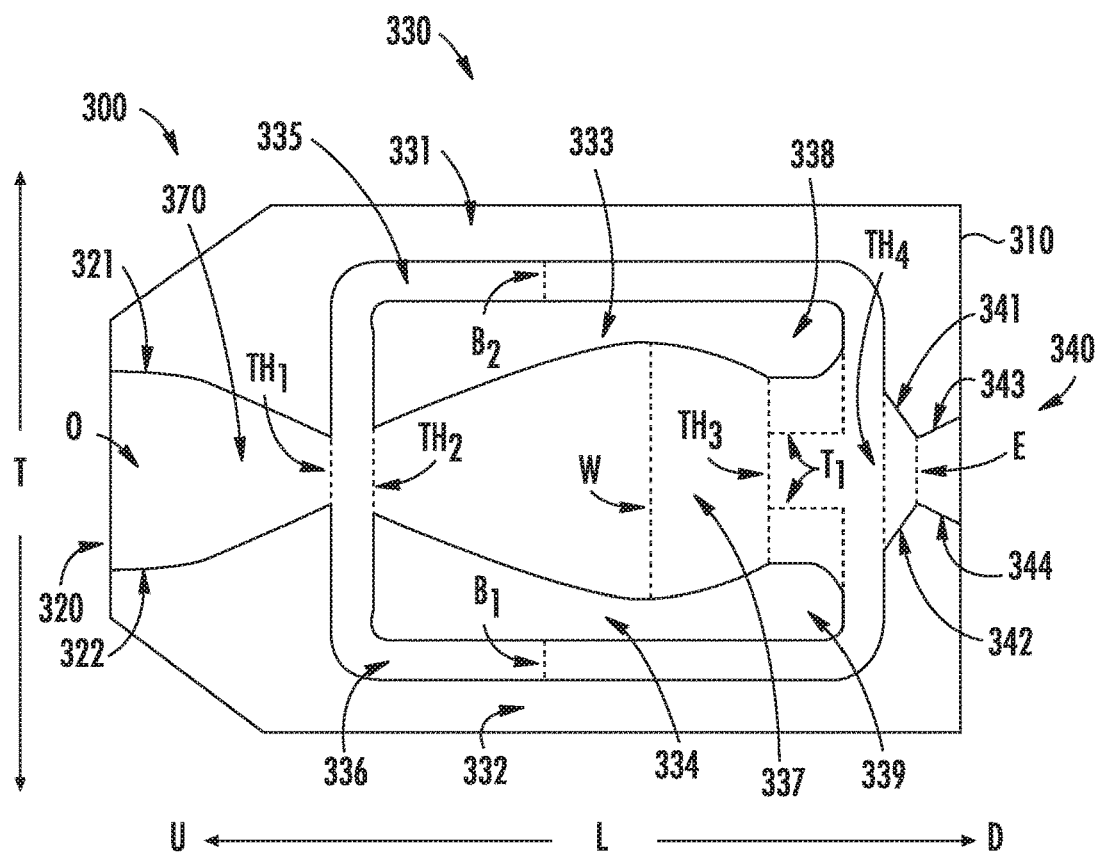
FIG. 3 depicts a top-view of an example nozzle according to example aspects of the present disclosure.

Referring now to FIG. 3, a top down view of an example nozzle 300 according to example aspects of the present disclosure is depicted. The nozzle 300 can be used in a cleaning system 200, and can correspond to the nozzles 222-226 depicted in FIG. 2. As shown, the nozzle 300 can include a baseplate 310. The baseplate 310 can include an inlet 320, oscillator 330, and an outlet 340. The inlet 320 can be configured to receive a high pressure fluid, such as a high-pressure liquid from a liquid tank 208 or pressurized air from source of a pressurized gas 206. The inlet 320 can coupled with the oscillator 330 such that the inlet 320 is in fluid communication with the oscillator 330. For example, fluid flowing into the inlet 320 can flow into the oscillator 330. Similarly, the oscillator 330 can be coupled with the outlet 340 such that the oscillator 330 is in fluid communication with the outlet 340. For example, fluid flowing into the oscillator 330 can exit the nozzle 300 via the outlet 340.

The oscillator 330 can be associated with a longitudinal direction L and a tangential direction T. The tangential direction T can be generally perpendicular to the longitudinal direction L. An upstream direction U can run parallel to the longitudinal direction L. Fluid can enter the inlet 320 at the upstream direction U, flow generally through the nozzle 300 along the longitudinal direction L, and exit the nozzle 300 via the outlet 340 at the downstream direction D. Thus, fluid can generally flow from the upstream direction U to the downstream direction D.

In some implementations, the inlet 320 can include a first inlet wall 321 and a second inlet wall 322. The first inlet wall 321 can include a first portion and a second portion. For example, the first portion can be at an upstream direction of the first inlet wall 321, and the second portion can be at a downstream direction of the first inlet wall 321. Similarly, the second inlet wall 322 can include a first portion and a second portion. The first portion can be at an upstream direction of the second inlet wall 322 and the second portion can be at a downstream direction of the second inlet wall 322. The second inlet wall 322 can be opposite the first inlet wall 321, such as on an opposite side of the nozzle 300 along the tangential direction T from the first inlet wall 321.

The first portion of the first inlet wall 321 and the first portion of the second inlet wall 322 can together define an opening O configured to receive a pressurized fluid, such as a high pressure fluid. For example, in various implementations, the opening of the inlet 320 can include various couplers, connectors, or other adapters to allow the opening to receive the pressurized fluid, such as via a threaded, pressure fit, or other connection.

The second portion of the first inlet wall 321 and the second portion of the second inlet wall 322 can together define a first throat $TH_1$ having a first width. As shown, the first inlet wall 321 and the second inlet wall 322 can narrow from the opening O to the first throat $TH_1$.

The inlet 320 can provide an unimpeded path of fluid flow to the oscillator. For example, as shown, the inlet 320 does not include any obstructions in the path of fluid flow from the inlet to the oscillator, such as posts, diverters, or other obstructions. Rather, the inlet 320 includes two sidewalls which narrow to a throat, but do not impede the path of fluid flow, such as in an inlet including posts or diverters.

In some implementations, the fluid received at the inlet 320 can be a high pressure fluid at a pressure of greater than 4.8 bar. For example, the inlet 320 can be coupled to a supply line which can be coupled to a source of high pressure fluid (e.g., liquid tank 208) in some implementations, a flow control device can be coupled between the inlet 320 and the source of high pressure fluid to allow or impede the flow of the high pressure fluid to the nozzle 300. The fluid (e.g., liquid, compressed air) received at the inlet 320 at a pressure of greater than 4.8 bar. In some implementations, the high-pressure fluid can be at a pressure within a range of 4.8 bar to 6.2 bar. In some implementations, the high pressure fluid can be at any suitable pressure.

The oscillator 330 can be configured to receive the pressurized fluid from the inlet and generate an oscillating fluid. For example, in some implementations, the oscillator 330 can include a first side wall 331, a second side wall 332, a first oscillation wall 333, and a second oscillation wall 334. The first oscillation wall 333 and the first side wall 331 can together define a first bypass tube 335, and the second oscillation wall 334 and the second side wall 332 can together define a second bypass tube 336. In some implementations, the first bypass tube 335 can have a first bypass width $B_2$, and the second bypass tube 336 can have a second bypass width $B_1$. The first bypass width $B_2$ and/or the second bypass width $B_1$ can be, for example, the width between the first side wall 331 and the first oscillation wall 333 or the second sidewall 332 and the second oscillation wall 334, respectively.

In some implementations, the first oscillation wall 333 and the second oscillation wall 334 can together define a mixing chamber 337. Further, the first oscillation wall 333 and the second oscillation wall 334 can together define a second throat $TH_2$ having a second width and a third throat $TH_3$ having a third width. The second throat $TH_2$ can be at an upstream portion of the mixing chamber 337 and the third throat $TH_3$ can be at a downstream portion of the mixing chamber 337. The mixing chamber can further define a maximum width W along the tangential direction between the second throat and the third throat. In some implementations, the width of the second throat $TH_2$ and the width of the third throat $TH_3$ can be less than the maximum width W. For example, the mixing chamber 337 can widen from the second throat $TH_2$ to the maximum width W, and narrow from the maximum width W to the third throat $TH_3$.

In some implementations, the first oscillation wall 333 can include a first bumper 338 at a downstream portion of the first oscillation wall 333. Similarly, the second oscillation wall 334 can include a second bumper 339 at a downstream portion of the second oscillation wall 334. Each bumper 338/339 can define a bumper length $T_1$ along the longitudinal direction. For example, in some implementations, the first bumper 338 and the second bumper 339 can be the same length.

As the pressurized fluid flows from the inlet 320 into the oscillator 330, a first portion of the fluid can flow into the first bypass tube 335, and a second portion of the fluid can flow into the second bypass tube 336. A third portion of the fluid can flow into the mixing chamber. As the first portion and the second portion flow through the first bypass tube 335 and the second bypass tube 336, respectively, a portion of each of the first portion and the second portion can flow around the first bumper 338 and the second bumper 339, respectively, and into the mixing chamber 337. In some implementations, each bumper can include a generally convex portion configured to assist in directing a flow from each respective bypass tube into the mixing chamber. This flow can cause alternating pressure differentials to build up on the first oscillation wall 333 and the second oscillation wall 334 in order to cause the flow of the fluid to oscillate. In this way, the oscillator 330 can be configured to receive the pressurized fluid (e.g., a high pressure fluid) from the inlet 320 generate an oscillating flow.

The outlet 340 can be configured to receive the flow of the oscillating fluid from the oscillator 330. The outlet 340 can include a first exit wall 341 proximate to the first bypass tube 335, and a second exit wall 342 proximate to the second bypass tube 336. The first and second exit walls 341/342 can together define a fourth throat $TH_4$ having a fourth width and an exit E. In some implementations, the outlet can narrow from the fourth throat $TH_4$ to the exit E.

The outlet 340 can be configured to receive the oscillating fluid and provide the oscillating fluid to a surface to delaminate debris from the surface. For example, the outlet 340 can be configured to eject the oscillating fluid onto the surface of a sensor 101 in order to delaminate debris from the sensor 101.

In some implementations, the outlet can include exit side walls 343 and 344, such as at a flared portion downstream of the exit E. For example, in some implementations, the flared portion can flare across an angle of approximately 60°.

Figure 4:
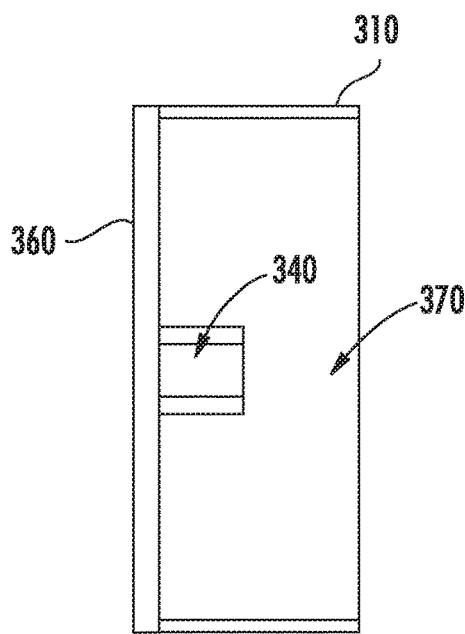
FIG. 4 depicts a side-view of an example nozzle according to example aspects of the present disclosure.

Referring now to FIG. 4, a side view of the example nozzle 300 of FIG. 3 is depicted. As shown, the nozzle 300 can include the baseplate 310 and a top 360. Also depicted is the outlet 340.

In some implementations, the baseplate 310 and/or top 360 can be manufactured out of a single piece of material. For example, in some implementations, the baseplate 310 and/or top 360 can be milled from a solid piece of material (e.g., aluminum, steel, plastic). For example, the inlet 320, bypass flow tubes 342/344, mixing chamber 346, and outlet 340 can be cut into a solid piece of material, thereby creating a floor 370 on the baseplate and the various fluid flow pathways of the nozzle 300. In some implementations, the baseplate 310 and/or top 360 can be manufactured by additive manufacturing, injection molding, or any other suitable process.

In some implementations, the top 360 can be manufactured out of the same or similar material as the baseplate 310, such as metal or plastic, and can be attached to the baseplate 310 in order to enclose the various chambers. The top 360 can be attached to the baseplate 310 in order to enclose the inlet 320, the oscillator 330, and the outlet 340. For example, in some implementations, the top 360 can be attached to the baseplate 310 via laser welding, ultrasonic welding, brazing, conventional welding, coupling via one or more fasteners (e.g., screws), or any other suitable method. In such fashion, the nozzle 300 can become essentially air and/or watertight, excepting the opening and the exit. In some implementations, the top 360 can be essentially parallel to the floor 370 of the baseplate 310.

Although FIGS. 3 and 4 depict the baseplate 310 and top 360 as separate pieces, one of ordinary skill in the art will recognize that in some implementations, the nozzle 300 can be manufactured such that the baseplate 310 and top 360 are constructed out of a single piece of material, such as via casting, injection molding, additive manufacturing, etc.

Figure 5:
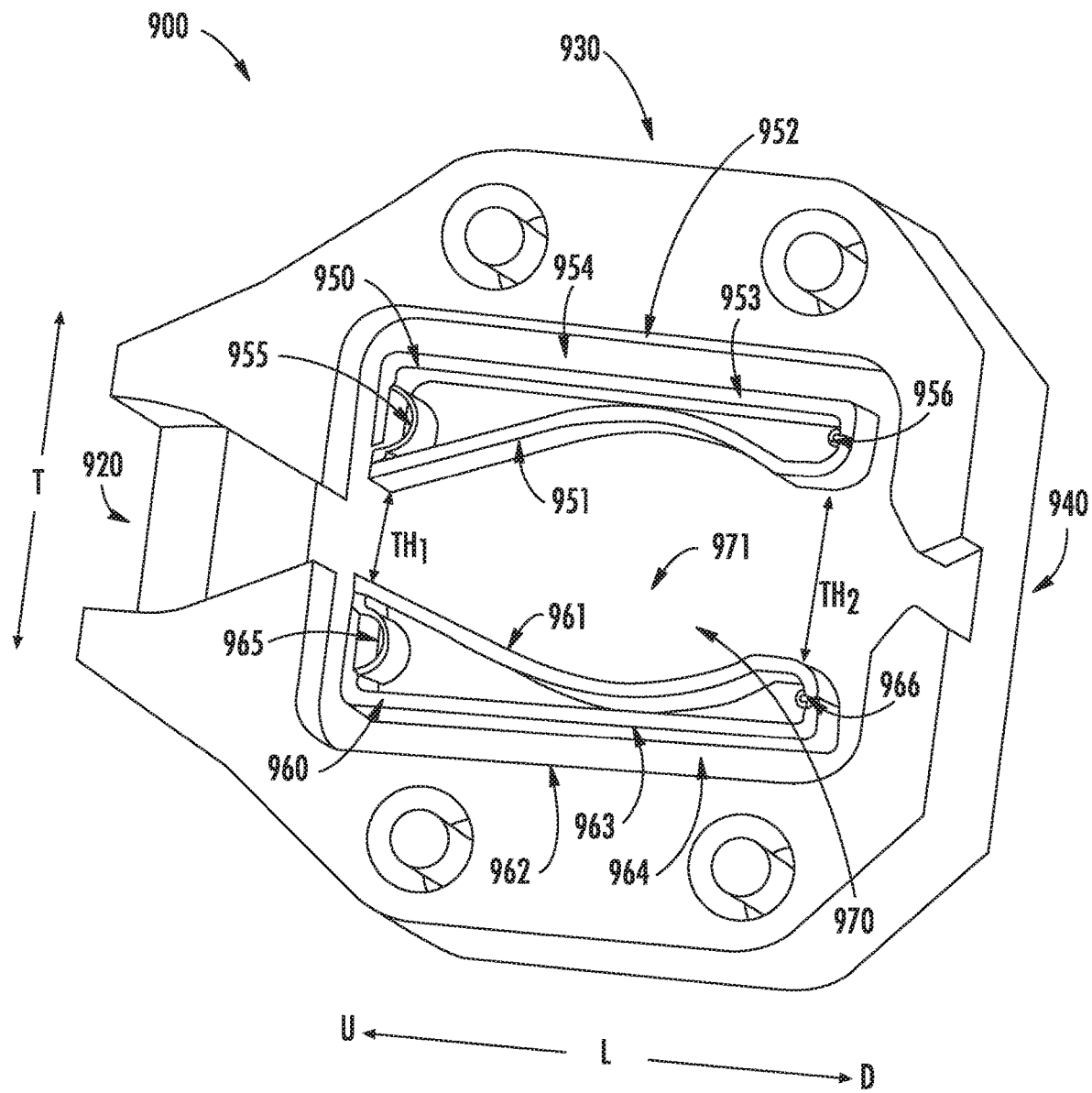
FIG. 5 depicts perspective view of an example adjustable nozzle according to example aspects of the present disclosure.

Referring now to FIG. 5, a perspective view of an example adjustable nozzle 900 according to additional example aspects of the present disclosure is depicted. For example, in some implementations, an adjustable nozzle 900 can be used as a nozzle 222-226 in a cleaning system 200.

The adjustable nozzle 900 can include similar components as a nozzle 300, with a primary difference being that the adjustable nozzle 900 includes an adjustable oscillator 930. For example, an adjustable nozzle 900 can include an inlet 920. The inlet 920 can be configured to receive a pressurized fluid, such as pressurized air (e.g. compressed air) or pressurized liquid. In some implementations, the pressurized fluid can be a high-pressure fluid, such as a fluid at a pressure greater than 4.8 bar.

The adjustable oscillator 930 can be coupled with the inlet 920. For example, the adjustable oscillator 930 can be in fluid communication with the inlet 920 such that the pressurized fluid can flow from the inlet 920 into the adjustable oscillator 930. In this way, the adjustable oscillator can be configured to receive the pressurized fluid from the inlet 920. Further, the adjustable oscillator 930 can be configured to generate an oscillating fluid. The adjustable nozzle 900 can further include an outlet 940 coupled with the adjustable oscillator 930. The outlet 940 can be configured to receive the oscillating fluid and eject the oscillating fluid from the adjustable nozzle 900.

The adjustable oscillator 930 can be associated with a longitudinal direction L and a tangential direction T. The tangential direction T can be generally perpendicular to the longitudinal direction L. An upstream direction U can run parallel to the longitudinal direction L. Fluid can enter the inlet 920 at the upstream direction U, flow generally through the nozzle 900 along the longitudinal direction L, and exit the nozzle 900 via the outlet 940 at the downstream direction D. Thus, fluid can generally flow from the upstream direction U to the downstream direction D.

The adjustable oscillator 930 can include a first oscillation wall 950 and a second oscillation wall 960. The first oscillation wall 950 can include a first adjustable chamber modifier wall 951. Similarly, oscillation wall 960 can include a second adjustable chamber modifier wall 961. The first adjustable chamber modifier wall 951 and the second adjustable chamber modifier wall 961 can together define an adjustable mixing chamber 970. The adjustable mixing chamber 970 can be configured to generate the oscillating fluid, which can have one or more properties that are adjustable by the first adjustable chamber modifier wall 951 or the second adjustable chamber modifier wall 961. For example, in some implementations, the one or more properties of the oscillating fluid that the first adjustable chamber modifier wall 951 and/or the second adjustable chamber modifier wall 961 can be configured to adjust can include an oscillation frequency, an oscillation angle, or a direction of a flow of the oscillating fluid.

The adjustable oscillator 930 can further include a first sidewall 952 and a second side wall 962. The first oscillation wall 950 can also include a first bypass wall 953. Similarly, the second oscillation wall 960 can include a second bypass wall 963. The first bypass wall 953 and the first sidewall 952 can together define a first bypass tube 954, and the second bypass wall 963 and the second sidewall 962 can together define a second bypass tube 964. The first bypass tube 954 and the second bypass tube 964 can be similar to and have similar functionality as the first bypass tube 335 and second bypass tube 336, as depicted in FIG. 3. For example, a first portion of the flow of the pressurized fluid received the inlet 920 can flow into the first bypass tube 954, and a second portion of the pressurized fluid received at the inlet 920 can flow through the second bypass tube 964.

The first oscillation wall 950 can further include a first upstream flexure 955 at an upstream portion of the first oscillation wall 950 and a first downstream flexure 956 at a downstream portion of the first oscillation wall 950. Similarly, the second oscillation wall 960 can include a second upstream flexure 965 at an upstream portion of the second oscillation wall 960 and a second downstream flexure 966 at a downstream portion of the second oscillation wall 960. The first adjustable chamber modifier wall 951 can be connected to the first bypass wall 953 by the first upstream flexure 955 and the first downstream flexure 956. Similarly, the second adjustable chamber modifier wall 961 can be coupled to the second bypass wall 963 by the second upstream flexure 965 and the second downstream flexure 966. Each of the first upstream flexure 955, the first downstream flexure 956, the second upstream flexure 965, and the second downstream flexure 966 can be independently movable to adjust the adjustable mixing chamber. For example, in some implementations, the flexures 955/956/965/966 can be molded out of a flexible plastic, such as via an injection molding process. The first adjustable chamber modifier wall 951 and the second adjustable chamber modifier wall 961 can be disconnected from a floor 971 of the adjustable nozzle 930 such that the first adjustable chamber modifier wall 951 and the second adjustable chamber modifier wall 961 can move generally along the tangential direction T to adjust the adjustable mixing chamber 970.

For example, the first adjustable chamber modifier wall 951 and the second adjustable chamber modifier wall 961 can together define a first throat $TH_1$ at an upstream portion (i.e., upstream throat) of the adjustable oscillator 930 and a second throat $TH_2$ at a downstream portion (i.e., downstream throat) of the adjustable oscillator 930. The width of the first throat $TH_1$ and the width of the second throat $TH_2$ can be adjusted by moving the first adjustable chamber modifier wall 951 and second adjustable chamber modifier wall 961. For example, an upstream portion or a downstream portion of the first adjustable chamber modifier wall 951 can move generally along the tangential direction T to extend towards or retract away from the second adjustable chamber modifier wall 961, or vice-versa, in order to increase or decrease the adjustable mixing chamber 970. In this way, the adjustable mixing chamber 970 can be adjusted by the adjustable chamber modifier walls 951/961.

In some implementations, the adjustable nozzle 900 can be controlled by a controller, such as a controller 250. For example, a controller can be configured to control the independent movement of the first upstream flexure 955, the first downstream flexure 956, the second upstream flexure 965, and the second downstream flexure 966 in order to adjust the adjustable mixing chamber 970.

Figure 6:
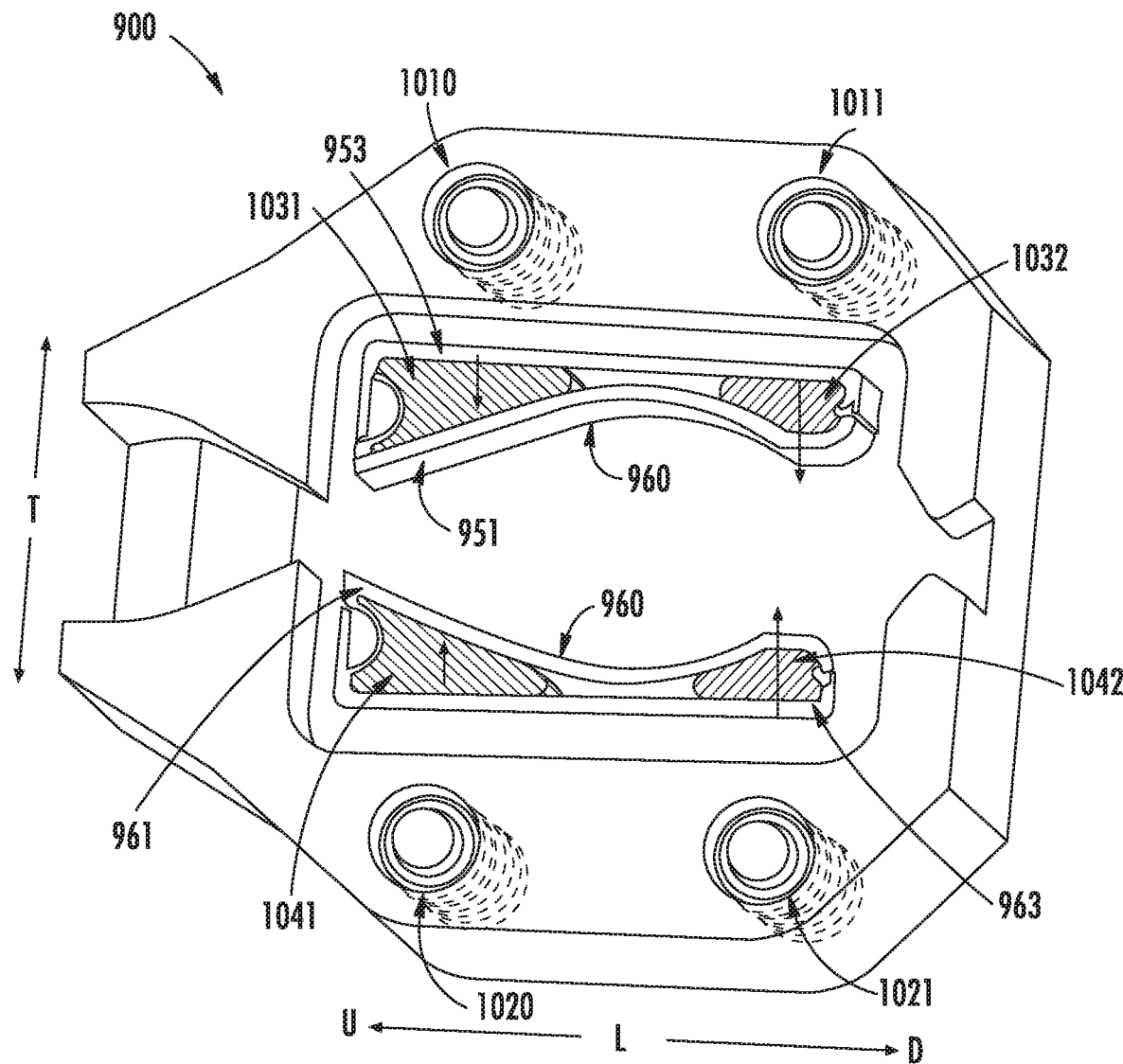
FIG. 6 depicts perspective view of an example adjustable nozzle according to example aspects of the present disclosure.

For example, referring now to FIG. 6, an example controllable adjustable nozzle 900 according to additional example aspects of the present disclosure is depicted. FIG. 6 depicts the same adjustable nozzle 900 as FIG. 5, but includes additional details and components that will be discussed in greater detail below.

For example, in some implementations, an adjustable nozzle 900 can include one or more electromagnets configured to generate one or more electromagnetic fields. In some implementations, a controller, such as a controller 250, can be configured to control the one or more electromagnets to adjust the shape of the adjustable mixing chamber 970.

For example, in some implementations as shown in FIG. 6, an adjustable nozzle 900 can include a first upstream electromagnet 1010, a first downstream electromagnet 1011, a second upstream electromagnet 1020, and a second downstream electromagnet 1021. The electromagnets 1010/1011/1020/1021 can be, for example, coiled inductors, each of which can generate an electromagnetic field when a current is run through the coiled inductor. Similarly, other suitable electromagnets can be used.

In some implementations, the adjustable nozzle can include one or more magnetically controllable fluids. For example, in some implementations, the magnetically controllable fluid can be FerroFluid. Similarly, other magnetically controllable fluids can be used. In some implementations, the magnetically controllable fluid can be configured to react to the one or more electromagnetic fields generated by the one or more electromagnets to adjust the shape of the adjustable mixing chamber.

For example, in some implementations as shown in FIG. 6, the first bypass wall 953 and the first adjustable chamber modifier wall 951 can define a first cavity at an upstream portion (i.e. first upstream cavity) and a first cavity at a downstream portion (i.e., first downstream cavity) of the first oscillation wall 950. Similarly, the second bypass wall 963 and the first adjustable chamber modifier wall 961 can define a second cavity at an upstream portion (i.e. second upstream cavity) and a second cavity at a downstream portion (i.e., second downstream cavity) of the second oscillation wall 960.

In some implementations, a first upstream magnetically controllable fluid 1031 can be positioned in the first upstream cavity, a first downstream magnetically controllable fluid 1032 can be positioned in the first downstream cavity, a second upstream magnetically controllable fluid 1041 can be positioned in the second upstream cavity, and a second downstream magnetically controllable fluid 1042 can be positioned in the second downstream cavity, as depicted in FIG. 6.

In some implementations, the one or more magnetically controllable fluids can be controlled by one or more magnetic fields. For example, a magnetic field can cause the magnetically controllable fluid to align along the magnetic field flux lines. For example, the magnetically controllable fluids 1031/1032/1041/1042 positioned in their respective cavities can react to magnetic fields generated by the electromagnets 1010/1011/1020/1021. As the magnetically controllable fluids 1031/1032/1041/1042 align with the respective electromagnetic fields, the magnetically controllable fluids can exert a pressure on the respective flexures 955/956/965/966 and/or chamber modifier walls 951/961 to expand or contract the adjustable mixing chamber 970.

For example, in some implementations, the first upstream electromagnet 1010 can be configured to generate a first upstream electromagnetic field across the first upstream magnetically controllable fluid 1031, the first downstream electromagnet 1011 can be configured to generate a first downstream electromagnetic field across the first downstream magnetically controllable fluid 1032, the second upstream electromagnet 1020 can be configured to generate a second upstream electromagnetic field across the second upstream magnetically controllable fluid 1041, and the second downstream electromagnet 1021 can be configured to generate a second downstream electromagnetic field across the second downstream magnetically controllable fluid 1042. For example, as shown in FIG. 6, each of the electromagnets 1010/1011/1020/1021 are each positioned generally along the tangential direction from the respective magnetically controllable fluids 1031/1032/1041/1042 external from the adjustable mixing chamber 970. In some implementations, each of the electromagnets 1010/1011/1020/1021 can each be positioned outside of the first and second bypass tubes 954/964.

In some implementations, each of the electromagnets 1010/1011/1020/1021 can be controlled to generate a respective magnetic field. For example, a current can be run through each electromagnet 1010/1011/1020/1021 to generate a respective magnetic field. The magnetically controllable fluids 1031/1032/1041/1042 (e.g., FerroFluid) can react to the respective magnetic field by forming along the flux lines of the field. This, in turn, can cause the respective magnetically controllable fluid 1031/1032/1041/1042 to expand the flexures 955/956/965/966 in the respective location. For example, the first upstream magnetically controllable fluid 1031 can extend or contract generally along the tangential direction, thereby creating a force on the first upstream flexure 955, causing the upstream portion of the first adjustable chamber modifier wall 951 to extend or retract generally along the tangential direction, thereby narrowing or expanding the adjustable mixing chamber 970. Similarly, each respective magnetically controllable fluid 1031/1032/1041/1042 can react to a respective magnetic field generated by the respective electromagnet 1010/1011/ 1020/1021.

In some implementations, the first upstream electromagnet 1031 and the second upstream electromagnet 1041 can be configured to adjust a width and orientation of the upstream throat $TH_1$ by generating the first upstream electromagnetic field and the second upstream electromagnetic field, respectively. Similarly, the first downstream electromagnet 1032 and the second downstream electromagnet 1032 can be configured to adjust a width and orientation of the downstream throat $TH_2$ by generating the first downstream electromagnetic field and the second downstream electromagnetic field, respectively. In this way, the adjustable mixing chamber 270 can be finely controlled by controlling the electromagnetic fields generated by each of the electromagnets 1010/1011/1020/1021 in the adjustable nozzle 900.

In some implementations, the first upstream electromagnet 1010, the first downstream electromagnet 1011, the second upstream electromagnet 1020, and the second downstream electromagnet 1021 can be configured to be controlled by a controller, such as a controller 250, to induce the first upstream electromagnetic field, the second downstream electromagnetic field, the second upstream looked magnetic field, and the second downstream electromagnetic field, respectively. For example, the controller 250 can be configured to control a current provided to each of the electromagnets 1010/1011/1020/1021 independently. In this way, the controller 250 can be configured to control the movement of the adjustable chamber modifier walls 951/961 by controlling the current provided to the electromagnets 1010/ 1011/1020/1021.

By adjusting the size and configuration of the adjustable mixing chamber 970, several properties of the oscillating fluid generated by the adjustable nozzle 900 can be adjusted. For example, expanding and/or contracting the adjustable chamber modifier walls 951/961 can adjust the oscillation frequency, the oscillation angle, and/or the direction of the flow of the oscillating fluid. For example, adjusting the width and/or orientation of the first throat $TH_1$ and/or the width of the second throat $TH_2$ can, in some implementations, adjust the oscillation frequency, the oscillation angle, and/or the direction of flow of the oscillating fluid. For example, the oscillation frequency can be increased or decreased, the direction of flow can be directed from one side of the nozzle 900 to the other, and the oscillation angle θ can be widened or narrowed, as desired. In this way, the adjustable nozzle 900 can be finely controlled, such as by a controller, to adjust the one or more properties of the oscillating fluid generated by the adjustable nozzle 900.

In some implementations, the adjustable nozzle 900 can be controlled by a controller, such as a controller 250 in a system 200, based at least in part on sensor data indicative of debris. For example, the sensor data from the sensor 232-236 can indicate that debris is located on a particular part of the sensor 232-236 or that the debris is a particular type of debris. In some implementations, the controller 250 can control the adjustable nozzle 900 based at least in part on the sensor data indicative of debris such as, for example, by controlling the oscillation rate, oscillation angle, or direction of flow of oscillating fluid from the nozzle based on the sensor data indicative of debris. For example, the controller 250 can direct a flow of oscillating fluid to a particular area where the debris is located, and/or increase or decrease the oscillation rate of the oscillating fluid to improve the delaminating effect of the oscillating fluid.

In some implementations, the controller 250 can further obtain sensor data indicative of a spray of fluid from the adjustable nozzle 900. For example, a camera can collect imagery data of the oscillating fluid from the adjustable nozzle 900 spraying onto a lens of the camera. The imagery data can indicate, for example, whether or not the oscillating fluid is successfully delaminating the debris from the lens. For example, the imagery data can indicate whether the oscillating fluid is spraying in the correct area to delaminate the debris, or whether the oscillation frequency or oscillation angle is effectively delaminating the debris.

In some implementations, the controller 250 can control the adjustable nozzle 900 based at least in part on the sensor data indicative of the spray of fluid. For example, the controller 250 can control the adjustable nozzle 900 to adjust an oscillation rate, an oscillation angle, or a direction of flow of the oscillating fluid from the nozzle based on the data indicative of the spray of fluid. For example, the controller 250 can use the sensor data indicative of the spray of fluid as a form of feedback in order to control the adjustable nozzle 900 to direct the flow of oscillating fluid to more effectively delaminate the debris from the surface of the sensor 232-236. For example, the controller 250 can use successive frames of imagery data to adjust the adjustable nozzle 900 to direct the flow of fluid to a particular area of the sensor 232-236.

Figure 7:
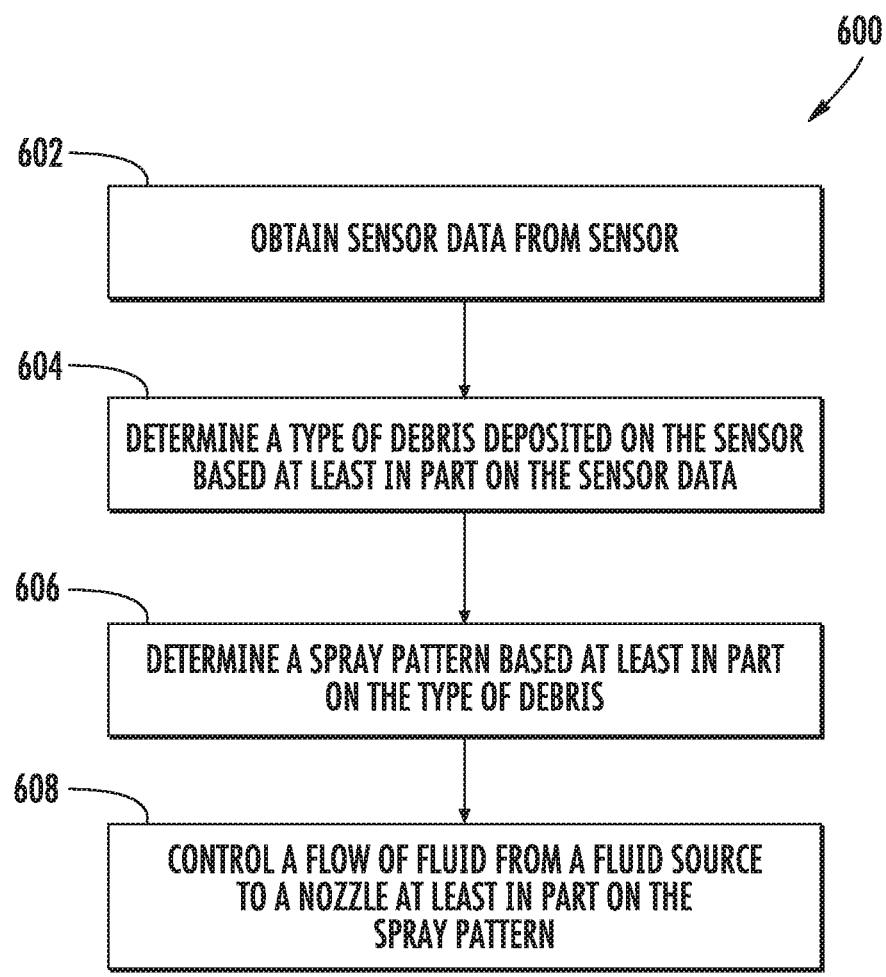
FIG. 7 depicts a flow diagram of an example method according to example aspects of the present disclosure.

Referring now to FIG. 7, an example method (600) to clean a sensor of an autonomous vehicle according to example aspects of the present disclosure is depicted. Although FIG. 6 depicts steps performed in a particular order for purposes of illustration and discussion, the methods of the present disclosure are not limited to the particularly illustrated order or arrangement. The various steps of method (600) can be omitted, rearranged, combined, and/or adapted in various ways without deviating from the scope of the present disclosure. The method (600) can be implemented by a controller, such as a controller 250 comprising one or more processors.

At (602), the method (600) can include obtaining sensor data from a sensor. For example, in some implementations, the sensor data can be obtained from a LIDAR sensor, a RADAR sensor, or a camera. The sensor data can be, for example, camera data, LIDAR data, RADAR data, or other sensor data. In some implementations, the sensor data can include data indicative of debris.

At (604), the method (600) can include determining a type of debris deposited on the sensor based at least in part on the sensor data. For example, in some implementations, the type of debris can include dust, organic matter less than a threshold length, organic matter greater than the threshold length, light snow, salt spray or frozen road debris, frost or ice, or other types of debris. For example, in some implementations, the controller can analyze the sensor data, such as camera data, LIDAR data, or RADAR data, to determine a type of debris deposited on a sensor. In some implementations, the controller can determine a type of debris deposited on a first sensor based on sensor data from a second sensor.

At (606), the method (600) can include determining a spray pattern. For example, in some implementations, the spray pattern can be determined based at least in part on the type of debris deposited on a sensor. For example, the spray pattern can include a spray duration, a spray location, a number of times to spray, and/or a pause duration between successive sprays. For example, in some implementations, the spray pattern can include a single spray for a short, intermediate, or long-duration. In some implementations, the spray pattern can include a plurality of sprays, with one or more pause durations between successive sprays, such as a short, intermediate, or long pause.

At (608), the method (600) can include controlling a flow of the fluid from a fluid source to a nozzle based at least in part on the spray pattern. For example, in some implementations, the controller can be configured to control a flow control device to allow or impede a flow of the fluid from the fluid source to the nozzle. In some implementations, the nozzle can be an oscillating nozzle and/or an adjustable nozzle, as disclosed herein.

For example, in some implementations, an adjustable nozzle can be controlled based at least in part on sensor data. For example, in some implementations, the sensor data can be data indicative of debris, and the controller can control the adjustable nozzle based at least in part on the sensor data indicative of debris. For example, in some implementations, the controller can control an oscillation frequency, oscillation angle, and/or direction of a flow of fluid from the adjustable nozzle, such as to direct a flow onto a particular portion of a sensor surface in order to clean off debris deposited on the surface.

Further, in some implementations, the sensor data can further include sensor data indicative of a spray of fluid from the adjustable nozzle. For example, sensor data can be obtained while fluid is being sprayed from the adjustable nozzle onto a surface of the sensor. For example, camera data can be obtained showing the spray of fluid onto a surface of the camera, such as a lens. In some implementations, the controller can control the adjustable nozzle based at least in part on the sensor data indicative of the spray of fluid, such as by using the sensor data as a feedback loop in order to control the adjustable nozzle to direct the flow of fluid into a particular area in order to remove debris deposited on the sensor.

In this way, a controller can obtain sensor data, determine a spray pattern based at least in part on the sensor data, and control a flow of fluid from a fluid source to a nozzle based at least in part on the spray pattern. Further, the systems methods disclosed herein can allow for the efficient removal of debris deposited on one or more sensors by using spray patterns configured for removal of particular types of debris.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A sensor cleaning system configured to clean autonomous vehicle sensors, the sensor cleaning system comprising:
    a fluid source that supplies a fluid;
    a nozzle configured to provide a spray of the fluid to a sensor of an autonomous vehicle to remove debris from the sensor; and
    a controller comprising one or more processors and one or more non-transitory computer-readable media that collectively store instructions that, when executed by the one or more processors, cause the controller to perform operations, the operations comprising:
    obtaining sensor data from the sensor;
    determining a type of debris deposited on the sensor based at least in part on the sensor data;
    determining a spray pattern based at least in part on the type of debris; and
    controlling a flow of the fluid from the fluid source to the nozzle based at least in part on the spray pattern;
    wherein determining the spray pattern based at least in part on the type of debris comprises determining a spray duration based at least in part on the type of debris, a number of times to spray based at least in part on the type of debris, and a pause duration between successive sprays based at least in part on the type of debris.

2. The sensor cleaning system of claim 1, wherein determining the type of debris deposited on the sensor based at least in part on the sensor data comprises determining that the debris comprises dust.

3. The sensor cleaning system of claim 1, wherein determining the type of debris deposited on the sensor based at least in part on the sensor data comprises determining that the debris comprises organic matter less than a threshold length.

4. The sensor cleaning system of claim 1, wherein determining the type of debris deposited on the sensor based at least in part on the sensor data comprises determining that the type of debris comprises organic matter greater than a threshold length; and
    wherein, in response to determining that the debris comprises the organic matter greater than the threshold length, determining the spray pattern based at least in part on the type of debris comprises configuring the spray pattern as a first spray, a pause, and a second spray.

5. The sensor cleaning system of claim 1, wherein determining the type of debris deposited on the sensor based at least in part on the sensor data comprises determining that the debris comprises snow.

6. The sensor cleaning system of claim 1, wherein determining the type of debris deposited on the sensor based at least in part on the sensor data comprises determining that the debris comprises at least one of salt spray or frozen road debris.

7. The sensor cleaning system of claim 1, wherein determining the type of debris deposited on the sensor based at least in part on the sensor data comprises determining that the debris comprises at least one of frost or ice; and
    wherein, in response to determining that debris comprises at least one of the frost or the ice, determining the spray pattern based at least in part on the type of debris comprises configuring the spray pattern as a first spray for a first duration, a pause, and a second spray for a second duration.

8. The sensor cleaning system of claim 1, further comprising:
a flow control device in fluid communication with the fluid source and the nozzle, the flow control device configured to allow or impede a flow of the fluid from the fluid source to the nozzle;
wherein controlling a flow of the fluid from the fluid source to the nozzle based at least in part on the spray pattern comprises controlling the flow control device based at least in part on the spray pattern.

9. The sensor cleaning system of claim 1; wherein the nozzle comprises a nozzle configured to generate an oscillating fluid to delaminate debris from the sensor.

10. The sensor cleaning system of claim 1, wherein the fluid comprises a liquid at a pressure of greater than 4.8 bar.

11. The sensor cleaning system of claim 1, wherein the sensor comprises a LIDAR sensor, a RADAR sensor, or a camera.

12. The sensor cleaning system of claim 1, wherein the nozzle comprises an adjustable nozzle;
wherein the sensor data comprises sensor data indicative of debris; and
wherein the operations further comprise:
controlling the adjustable nozzle based at least in part on the sensor data indicative of debris.

13. The sensor cleaning system of claim 12, wherein the operations further comprise:
obtaining sensor data indicative of a spray of fluid from the adjustable nozzle; and
controlling the adjustable nozzle based at least in part on the sensor data indicative of the spray of fluid.

14. A method to clean a sensor of an autonomous vehicle, wherein the method is implemented by a computer, and wherein the method comprises:
obtaining, by a controller comprising one or more processors, sensor data from the sensor of the autonomous vehicle;
determining, by the controller, a type of debris deposited on the sensor based at least in part on the sensor data;
determining, by the controller, a spray pattern based at least in part on the type of debris; and
controlling, by the controller, a flow of fluid from a fluid source to a nozzle based at least in part on the spray pattern, wherein the nozzle is a nozzle arranged to spray fluid onto the sensor in order to remove debris from the sensor;
wherein determining, by the controller, the spray pattern based at least in part on the type of debris comprises determining a spray duration based at least in part on the type of debris, a number of times to spray based at least in part on the type of debris, and a pause duration between successive sprays based at least in part on the type of debris.

15. The method of claim 14, wherein obtaining, by the controller, sensor data comprises obtaining data from a LIDAR sensor, a RADAR sensor, or a camera.

16. The method of claim 14, wherein determining, by the controller, the type of debris deposited on the sensor based at least in part on the sensor data comprises determining the debris comprises dust, organic matter less than a threshold length, organic matter greater than the threshold length, light snow, salt spray or frozen road debris, or frost or ice.

17. The method of claim 14, wherein controlling, by the controller, the flow of the fluid from the fluid source to the nozzle based at least in part on the spray pattern comprises controlling a flow control device to allow or impede a flow of the fluid from the fluid source to the nozzle.

18. An autonomous vehicle, comprising:
a sensor; and
a sensor cleaning system configured to clean the sensor, comprising:
a fluid source that supplies a fluid, the fluid comprising a fluid at a pressure of greater than 4.8 bar;
a nozzle configured to provide a spray of the fluid to the sensor to remove debris from the sensor;
a flow control device in fluid communication with the fluid source and the nozzle, the flow control device configured to allow or impede a flow of the fluid from the fluid source to the nozzle; and
a controller comprising one or more processors and one or more non-transitory computer-readable media that collectively store instructions that, when executed by the one or more processors, cause the controller to perform operations, the operations comprising:
obtaining sensor data from the sensor;
determining a type of debris deposited on the sensor based at least in part on the sensor data;
determining a spray pattern based at least in part on the type of debris; and
controlling the flow control device based at least in part on the spray pattern;
wherein determining the spray pattern based at least in part on the type of debris comprises determining a spray duration based at least in part on the type of debris, a number of times to spray based at least in part on the type of debris, and a pause duration between successive sprays based at least in part on the type of debris.

* * * * *